(12) United States Patent
Yasuki et al.

(10) Patent No.: US 8,991,345 B2
(45) Date of Patent: Mar. 31, 2015

(54) VALVE TIMING ADJUSTING DEVICE

(71) Applicant: Denso Corporation, Kariya, Aichi-pref. (JP)

(72) Inventors: Yuusuke Yasuki, Nishio (JP); Shuhei Oe, Nukata-gun (JP); Makoto Otsubo, Anjo (JP); Taketsugu Sasaki, Nagoya (JP); Kuniaki Oka, Obu (JP); Akira Okada, Okazaki (JP); Takehiro Tanaka, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/050,693

(22) Filed: Oct. 10, 2013

(65) Prior Publication Data

US 2014/0096731 A1 Apr. 10, 2014

(30) Foreign Application Priority Data

Oct. 10, 2012 (JP) .................................. 2012-225254
Jul. 5, 2013 (JP) .................................. 2013-142118

(51) Int. Cl.
*F01L 1/34* (2006.01)
*F01L 1/344* (2006.01)

(52) U.S. Cl.
CPC ............... *F01L 1/344* (2013.01); *F01L 1/3442* (2013.01); *F01L 2001/34459* (2013.01); *F01L 2001/34463* (2013.01); *F01L 2001/34469* (2013.01); *F01L 2800/02* (2013.01); *F01L 2800/05* (2013.01); *Y02T 10/18* (2013.01)
USPC ..................................... 123/90.17; 123/90.15

(58) Field of Classification Search
USPC .................................. 123/90.15, 90.17, 90.31
See application file for complete search history.

(56) References Cited

U.S. PATENT DOCUMENTS 6,837,200 B2 * 1/2005 Ichinosawa ................ 123/90.17

FOREIGN PATENT DOCUMENTS

JP 2002-256910 9/2002
JP 4161356 8/2008

* cited by examiner

*Primary Examiner* — Zelalem Eshete
(74) *Attorney, Agent, or Firm* — Nixon & Vanderhye P.C.

(57) ABSTRACT

A main lock member is fitted in a main lock bore at a main lock phase for closing an intake valve at a timing later than a timing when a piston reaches a bottom dead center, whereby a rotation phase is locked. In a subordinate lock mechanism, the rotation phase is locked at a subordinate lock phase advancing further than the main lock phase. In a lock control mechanism, a temperature sensing body is changed to an expanded state, whereby a moving member is latched at a first position in which the main lock member is allowed to be fitted in the main lock bore, whereas at a main lock phase in a cold stop state after a timing when the temperature of the stopped internal combustion engine becomes less than a preset temperature, the temperature sensing body is changed to a contracted state.

10 Claims, 33 Drawing Sheets

VALVE TIMING ADJUSTING DEVICE

CROSS-REFERENCE TO RELATED APPLICATION

This application is based on Japanese Patent Applications No. 2012-225254 filed on Oct. 10, 2012, and No. 2013-142118 filed on Jul. 5, 2013, the disclosures of which are incorporated herein by reference.

FIELD OF THE INVENTION

The present invention relates to a valve timing adjusting device for adjusting a valve timing of an intake valve for opening and closing a cylinder of an internal combustion engine.

BACKGROUND OF THE INVENTION

There has been widely known a hydraulic valve timing adjusting device for adjusting a valve timing of an intake valve by the pressure of a working liquid. Generally, the hydraulic valve timing adjusting device is provided with a housing rotor and a vane rotor which rotate in conjunction with a crankshaft and a camshaft of the internal combustion engine, and when the vane rotor receives the pressure of the working liquid in the housing rotor, a rotation phase between these rotors is changed. As a result of the change in the rotation phase, a valve timing is adjusted.

Japanese Patent No. 4161356 discloses the following technique as a kind of hydraulic valve timing adjusting device: that is, in an internal combustion engine, assuming that a rotation phase advancing further than the most retarded phase is an intermediate phase, a rotation phase reaching the intermediate phase is locked at the time of starting the internal combustion engine. According to this locking function, a timing when the intake valve is closed is advanced as early as possible and hence an actual compression ratio in the cylinder is increased, so that the temperature of gas in the cylinder is increased by compression heating, which hence results in accelerating the vaporization of fuel. Hence, for example, at the time of cold starting of the internal combustion engine held unattended in the state where the internal combustion engine is stopped under a low temperature environment such as an extremely low temperature, startability can be ensured.

However, in the hydraulic valve timing adjusting device of Japanese Patent No. 4161356 in which an intake valve is closed at an early timing, a high actual compression ratio in the cylinder is likely to cause the following problems, for example, at the time of warm starting of the internal combustion engine under a comparative high temperature environment such as ordinary temperatures. One of the problems is the occurrence of knocking. Another problem is to cause a state of pre-ignition in which at the time of restarting the internal combustion engine applied to an idle stop system or a hybrid system or at the time of restarting just after stopping the engine by an ignition off, the temperature of gas when the gas is compressed in the cylinder becomes too high and hence the gas is ignited by itself before ignition. Still another problem is to cause uncomfortable vibrations and noises by increased variations in the cranking rotation caused by a large compressive reactive force.

Hence, in the hydraulic valve timing adjusting device disclosed in JP-2002-256910A, one of a retard phase and an intermediate phase advancing further than the retard phase is selected at the time of starting the internal combustion engine, the retard phase being a rotation phase for closing an intake valve at a timing later than a timing when a piston in a cylinder reaches a bottom dead center. According to this selection of the rotation phase, it is possible to realize starting suitable for the temperature of the internal combustion engine (hereinafter referred to as "engine temperature")

However, in the hydraulic valve timing adjusting device disclosed in JP-2002-256910A, by applying the pressure of the working liquid to a vane rotor in a housing rotor at the time of warm starting of the internal combustion engine, a retard phase is selected not by locking but by adjusting the rotation phase. For this reason, at the time of starting when the pressure of the working liquid is decreased, the vane rotor is relatively rotated to an advance side with respect to the housing rotor by a varying torque applied thereto from a camshaft and hence the rotation phase is easily shifted from the retard phase.

Furthermore, in the hydraulic valve timing adjusting device disclosed in JP-2002-256910A, a change of the rotation phase to the intermediate phase is caused by the varying torque at the time of cold starting of the internal combustion engine, so that the working liquid for applying pressure to the vane rotor in the housing rotor is drained. As a result, the working liquid for applying pressure to a lock body is also drained, so that the lock body is moved to a lock releasing position, which makes it difficult to lock the rotation phase at the intermediate phase.

SUMMARY OF THE INVENTION

The present invention has been made in view of the problems described above, and the object of the present invention is to provide a hydraulic valve timing adjusting device that realizes a starting suitable for an engine temperature.

The present invention is a valve timing adjusting device for adjusting a valve timing of an intake valve for opening and closing a cylinder of an internal combustion engine by pressure of a working liquid, and is characterized by including: a housing rotor that rotates in conjunction with a crankshaft of the internal combustion engine;

a vane rotor that rotates in conjunction with a camshaft of the internal combustion engine and receives pressure of the working liquid in the housing rotor, thereby having a rotation phase changed with respect to the housing rotor; a main lock portion that has a main lock member and a main lock bore, wherein at a main lock phase of the rotation phase for closing the intake valve at a timing later than a timing when a piston in the cylinder reaches a bottom dead center, the main lock member is fitted in the main lock bore to thereby lock the rotation phase; a subordinate lock portion that has a subordinate lock member and a subordinate lock bore, wherein at a subordinate lock phase of the rotation phase advancing further than the main lock phase, the subordinate lock member is fitted in the subordinate lock bore to thereby lock the rotation phase; and a lock control portion that has a temperature sensing body to be expanded and contracted and a moving member to be reciprocated between a first position and a second position each of which positions the main lock member, wherein at the main lock phase in a warm stop state during which an engine temperature of the stopped internal combustion engine becomes not less than a preset temperature, the temperature sensing body is changed to an expanded state, whereby the moving member is latched at the first position in which the main lock member is allowed to be fitted in the main lock bore, and wherein at the main lock phase in a cold stop state caused after the engine temperature of the stopped internal combustion engine becomes less than the preset temperature, the temperature sensing body is changed to a contracted state, whereby the moving member is unlatched and hence the moving member is moved to the second position in which the main lock member is released from being fitted in the main lock bore.

According to the characteristic of the present invention like this, in the warm stop state in which the engine temperature becomes not less than the preset temperature in the stopped internal combustion engine, the temperature sensing body is changed to the expanded state. In this way, the moving member is latched at the first position for positioning the main lock member, so that the main lock member is allowed to be fitted in the main lock bore at the main lock phase. That is, the rotation phase is allowed to be locked at the main lock phase. Here, in the main lock phase in which the intake valve is closed at a timing later than a timing when the piston in the cylinder reaches a bottom dead center, at the time of the next starting of the internal combustion engine, gas in the cylinder is pushed out to an intake air system according to a lift up of the piston after the piston reaches the bottom dead center, so that an actual compression ratio is decreased. Hence, at the time of the warm starting after a warm stop in which the engine temperature is not less than the preset temperature, the rotation phase is held locked at the main lock phase to thereby inhibit a malfunction at the starting (hereinafter referred to as "starting malfunction") such as knocking, pre-ignition, and uncomfortable vibrations and noises from being caused.

In contrast to this, in the cold stop state caused after the engine temperature becomes less than the preset temperature in the stopped internal combustion engine, the temperature sensing body is changed to the contracted state. In this way, the moving member is unlatched and is moved to the second position for positioning the main lock member, so that the main lock member is released from being fitted in the main lock bore at the main lock phase. That is, the rotation phase is released from being locked at the main lock phase, so that at the time of the next starting of the internal combustion engine, the vane rotor is relatively rotated to an advance side with respect to the housing rotor by a varying torque applied thereto from the camshaft. As a result, when the rotation phase is changed to the subordinate lock phase advanced further than the main lock phase, the subordinate lock member is fitted in the subordinate lock bore, whereby the rotation phase is locked at the subordinate phase and hence the timing at which the intake valve is closed can be made as early as possible. In this way, the amount of gas pushed out of the cylinder is decreased and hence the temperature of the gas is increased together with an actual compression ratio. Hence, even at the time of cold starting after the cold stop in which the engine temperature is less than the present temperature, it is possible to improve ignitability and to ensure startability.

According to the characteristic of the present invention as described above, it is possible to realize a starting suitable for the engine temperature.

Further, the present invention is a valve timing adjusting device for adjusting a valve timing of an intake valve for opening and closing a cylinder of an internal combustion engine by pressure of a working liquid, and is differently characterized by including: a housing rotor that rotates in conjunction with a crankshaft of the internal combustion engine; a vane rotor that rotates in conjunction with a camshaft of the internal combustion engine and receives pressure of the working liquid in the housing rotor, thereby having a rotation phase changed with respect to the housing rotor; a main lock portion that has a main lock member and a main lock bore, wherein at a main lock phase of the rotation phase for closing the intake valve at a timing later than a timing when a piston in the cylinder reaches a bottom dead center, the main lock member is fitted in the main lock bore to thereby lock the rotation phase; a subordinate lock portion that has a subordinate lock member and a subordinate lock bore, wherein at a subordinate lock phase of the rotation phase advancing further than the main lock phase, the subordinate lock member is fitted in the subordinate lock bore to thereby lock the rotation phase; and a lock control portion that has a temperature sensing body to be expanded and contracted and a moving member to be reciprocated between an opening position in which the main lock bore is opened and a closing position in which the main lock bore is closed, wherein at the main lock phase in a warm stop state during which an engine temperature of the stopped internal combustion engine becomes not less than a preset temperature, the temperature sensing body is changed to an expanded state, whereby the moving member is latched at the opening position in which the main lock member is allowed to be fitted in the main lock bore, and wherein at the main lock phase in a cold stop state caused after the engine temperature of the stopped internal combustion engine becomes less than the preset temperature, the temperature sensing body is changed to a contracted state, whereby the moving member is unlatched and hence the moving member is moved to the closing position in which the main lock member is released from being fitted in the main lock bore.

According to a different characteristic of the present invention like this, in the warm stop state during which the engine temperature becomes not less than the preset temperature in the stopped internal combustion engine, the temperature sensing body is changed to the expanded state. In this way, the moving member is latched at an opening position of the main lock bore, so that the main lock member is allowed to be fitted in the main lock bore at the main lock phase. That is, the rotation phase is allowed to be locked at the main lock phase. Here, in the main lock phase in which the intake valve is closed at a timing later than a timing when the piston in the cylinder reaches the bottom dead center, at the time of the next starting of the internal combustion engine, as described above, an actual compression ratio is decreased. Hence, at the time of warm starting after the warm stop in which the engine temperature becomes not less than the preset temperature, it is possible to inhibit the starting malfunction from being caused.

In contrast to this, in the cold stop state caused after the engine temperature becomes less than the preset temperature in the stopped internal combustion engine, the temperature sensing body is changed to the contracted state. In this way, the moving member is unlatched and is moved to the closing position, so that the main lock member is released from being fitted in the main lock bore at the main lock phase. That is, the rotation phase is released from being locked at the main lock phase, so that at the time of the next starting of the internal combustion engine, the vane rotor is relatively rotated to an advance side with respect to the housing rotor by a varying torque applied thereto from the camshaft. As a result, when the rotation phase is changed to the subordinate lock phase advancing further than the main lock phase, the subordinate lock member is fitted in the subordinate lock bore, whereby the rotation phase is locked at the subordinate phase and hence the timing at which the intake valve is closed can be made as early as possible. In this way, the actual compression ratio is increased as described above. Hence, even at the time of cold starting after the cold stop in which the engine temperature is less than the present temperature, it is possible to improve ignitability and to ensure startability.

According to the different characteristic of the present invention as described above, it is possible to realize a starting suitable for the engine temperature.

It is preferable in any one of the present inventions having the characteristics described above to employ a construction in which the lock control portion has a latch member that retains a latch opening part formed in the moving part to thereby latch the moving member and that is inhibited from latching the latch opening part to thereby unlatch the moving member. According to the construction described above, at the main lock phase in the warm stop state, the latch member latches the latch opening part of the moving member, which hence can surely realize latching to allow the rotation phase to be locked at the main lock phase. On the other hand, at the main lock phase in the cold stop state, the latch member is inhibited from latching the latch opening part of the moving member, which hence can surely realize unlatching to release the rotation phase from being locked at the main lock phase. According to the present invention described above, at the time of warm starting after the warm stop and at the time of cold starting after the cold stop, it is possible to surely realize the switching of the rotation phase to rotation phases suitable for the respective startings.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE PREFERRED EMBODIMENTS

Hereinafter, a plurality of embodiments of the present invention will be described on the basis of the drawings. Here, by denoting corresponding constituent elements in the respective embodiments by the same reference symbols, duplicate descriptions will be omitted in some cases. In the case where only one part of a construction in each of the embodiments is described, the constructions of the other embodiments described previously can be applied to the other parts of the construction. Furthermore, not only the combination of the constructions clearly shown in the descriptions of the respective embodiments but also, if the combination of the constructions of the respective embodiments does not present a problem, the constructions of the plurality of embodiments can be partially combined with each other even if they are not clearly shown.

First Embodiment

Figure 1:
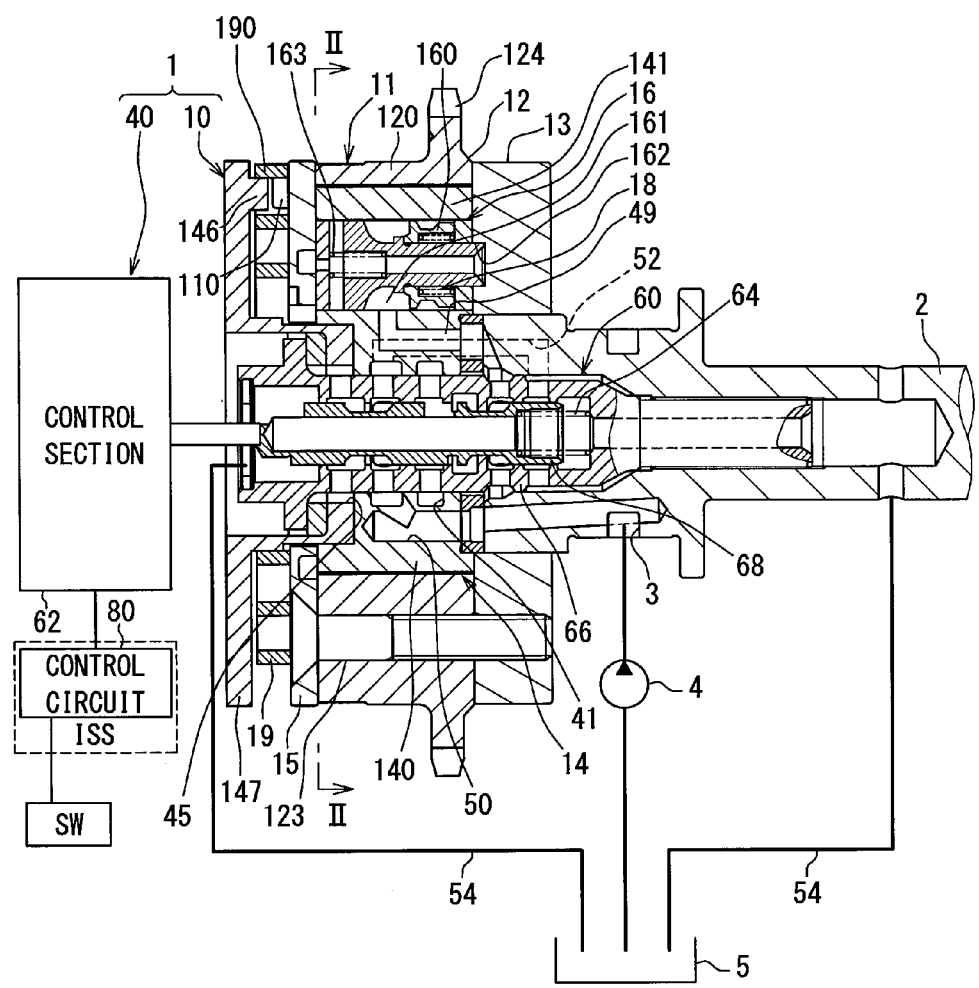
FIG. 1 is a figure to show a basic construction of a valve timing adjusting device according to a first embodiment of the present invention and is a section view taken on a line I-I of FIG. 2.

A valve timing adjusting device 1 according to a first embodiment of the present invention shown in FIG. 1 is mounted in an internal combustion engine of a vehicle. Here, in the present embodiment, the stopping and the starting of the internal combustion engine are realized not only according to an off command and an on command of an engine switch SW but also according to an idle stop command and a restart command of an idle stop system ISS.
(Basic Construction)

First, a basic construction of the valve timing adjusting device 1 will be described. The valve timing adjusting device 1 is a hydraulic type utilizing the pressure of a working oil as "the pressure of a working liquid" and adjusts a valve timing of an intake valve 9 (see FIG. 10 which will be later described in detail) as "a moving valve" that a camshaft 2 opens and closes when an engine torque is transmitted thereto. As shown in FIGS. 1 to 4, the valve timing adjusting device 1 includes a rotation drive section 10 for transmitting the engine torque, which is outputted from a crankshaft (not shown in the drawing) in the internal combustion engine, to the camshaft 2 and a control section 40 for controlling the inflow and outflow of the working oil to drive the rotation drive section 10.
(Rotation Drive Section)

In the rotation drive section 10, a housing rotor 11 made of metal has a rear plate 13 and a front plate 15 respectively fixed to both end parts in an axial direction of a shoe ring 12. The rear plate 13 has lock bores 162, 172 formed in a cylindrical shape, the lock bores 162, 172 being opened to the shoe ring 12 side.

Figure 2:
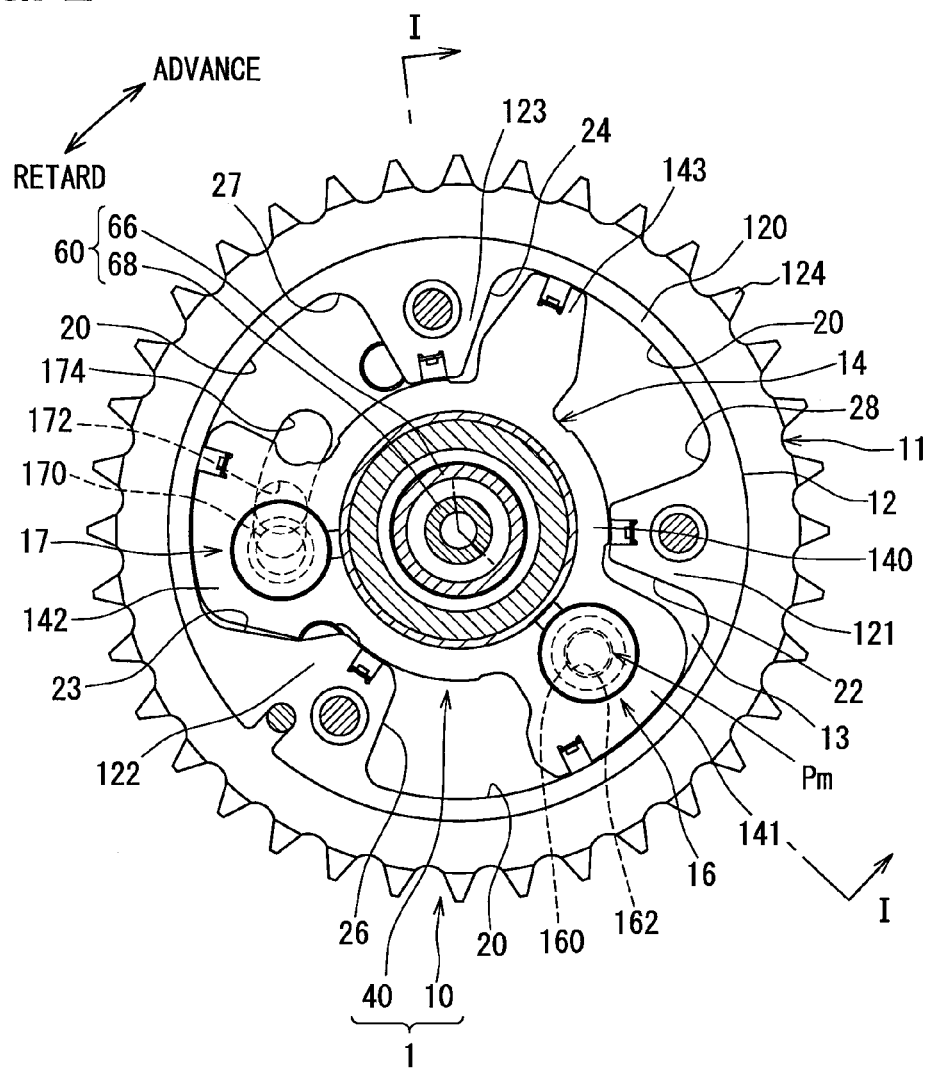
FIG. 2 is a section view taken on a line II-II of FIG. 1.

The shoe ring 12 includes a cylindrical housing main body 120, a plurality of shoes 121, 122, 123, and a sprocket 124. As shown in FIG. 2, the respective shoes 121, 122, 123 are protruded inside in a radial direction from parts spaced at specified intervals in a rotation direction of the housing main body 120. Housing chambers 20 are formed between the shoes 121 and 122, the shoes 122 and 123, and the shoes 123 and 121, which are adjacent to each other in the rotation direction, respectively. The sprocket 124 is coupled to the crankshaft via a timing chain (not shown in the drawing). The engine torque is transmitted from the crankshaft to the sprocket 124 during the rotation of the internal combustion engine by the coupling, so that the housing rotor 11 is rotated in conjunction with the crankshaft in a specified direction (clockwise in FIG. 2).

As shown in FIGS. 1, 2, the vane rotor 14 made of metal is housed coaxially in the housing rotor 11 has both end parts in the axial direction slid on the rear plate 13 and the front plate 15. The vane rotor 14 has a cylindrical rotary shaft 140, a plurality of vanes 141, 142, 143. The rotary shaft 140 is coaxially fixed to the camshaft 2. Since the vane rotor 14 is fixed in this manner, the vane rotor 14 can rotate in the same direction (clockwise in FIG. 2) as the housing rotor 11 in conjunction with the camshaft 2 and at the same time can rotate relatively to the housing rotor 11.

As shown in FIG. 2, the respective vanes 141, 142, 143 are protruded outside in the radial direction from parts spaced at specified intervals in the rotation direction of the rotary shaft 140 and are housed in the corresponding housing chambers 20. The respective vanes 141, 142, 143 divide the corresponding housing chambers 20 in the rotation direction, thereby partitioning advance chambers 22, 23, 24 and retard chambers 26, 27, 28 in the housing rotor 11, the advance chambers 22, 23, 24 and retard chambers 26, 27, 28 having the working oil flowed in and out. Specifically, the advance chamber 22 is formed between the shoe 121 and the vane 141, the advance chamber 23 is formed between the shoe 122 and the vane 142, and the advance chamber 24 is formed between the shoe 123 and the vane 143. On the other hand, the retard chamber 26 is formed between the shoe 122 and the vane 141, the retard chamber 27 is formed between the shoe 123 and the vane 142, and the retard chamber 28 is formed between the shoe 121 and the vane 143.

Figure 5:
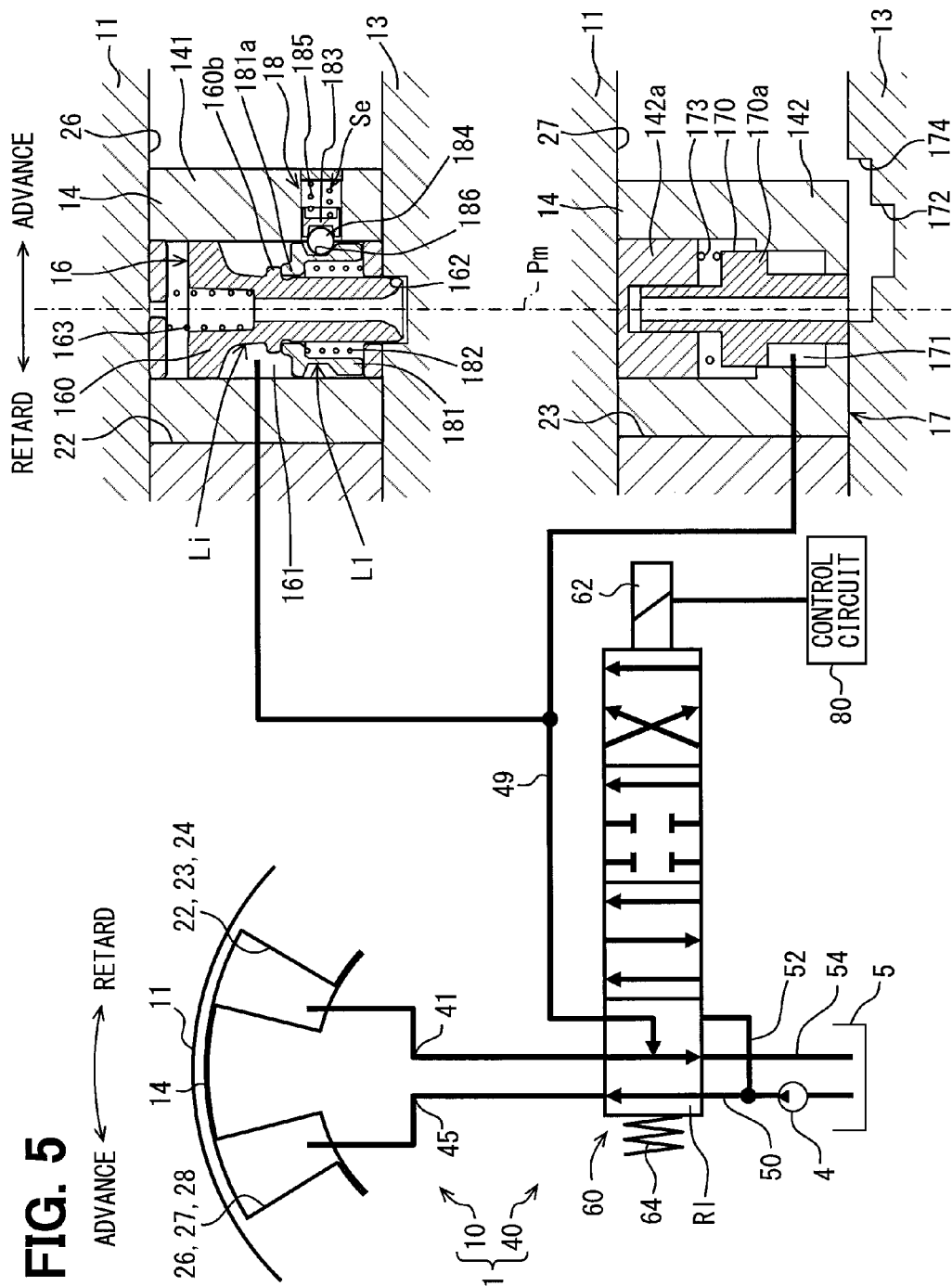
FIG. 5 is a schematic view to show one action state of the valve timing adjusting device of FIG. 1.
Figure 6:
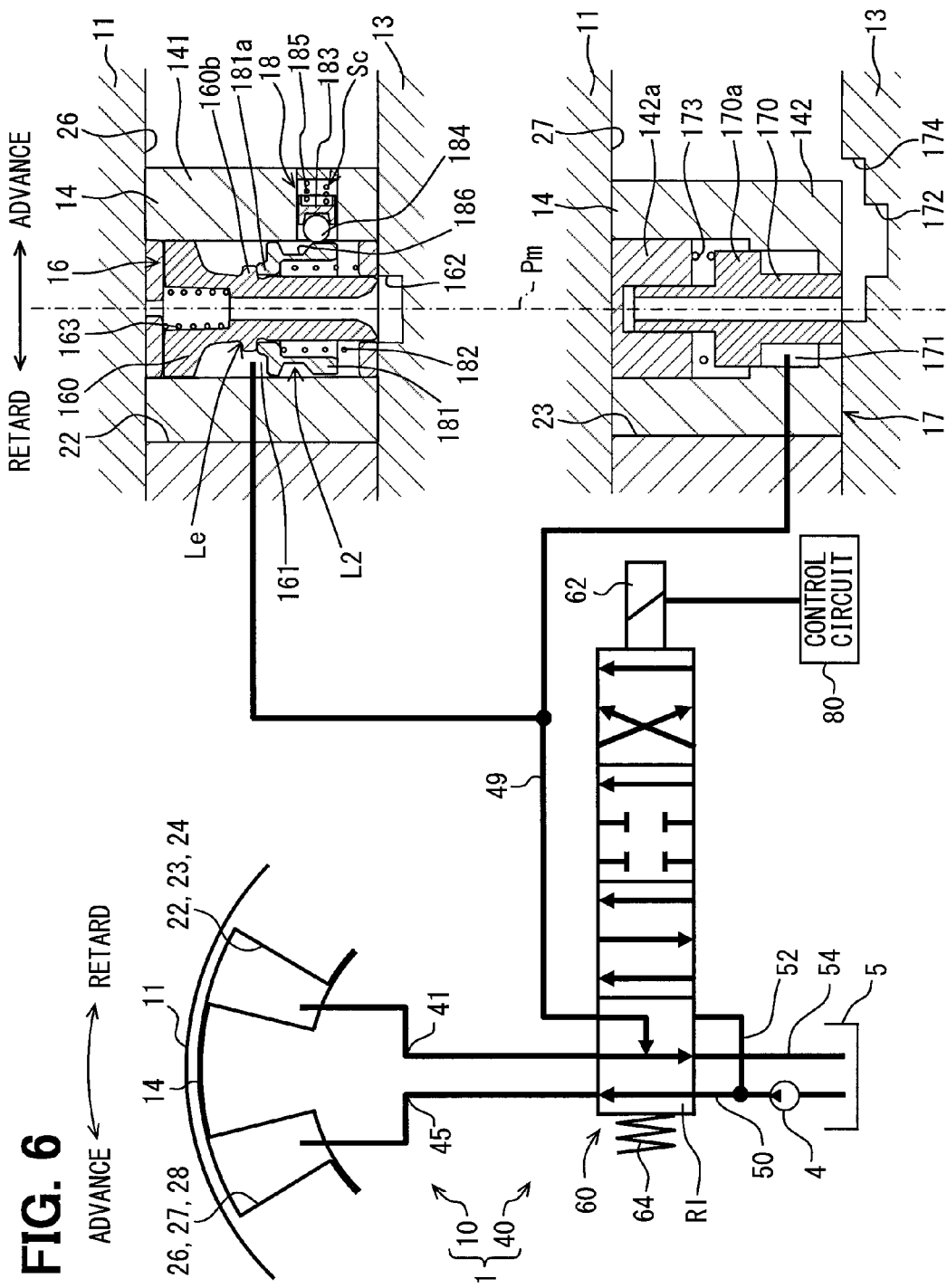
FIG. 6 is a schematic view to show another action state different from FIG. 5 of the valve timing adjusting device of FIG. 1.
Figure 7:
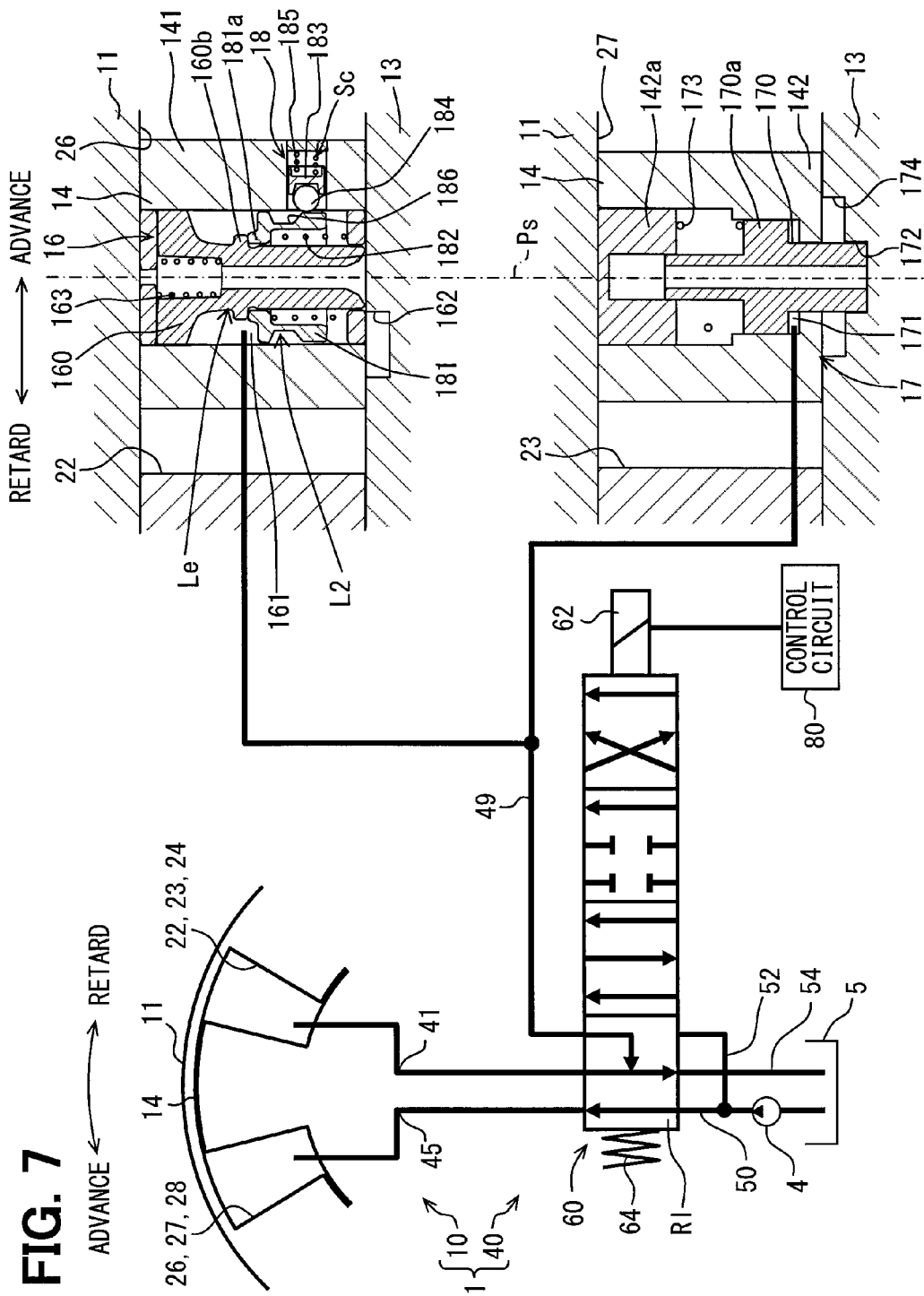
FIG. 7 is a schematic view to show still another action state different from FIGS. 5, 6 of the valve timing adjusting device of FIG. 1.
Figure 8:
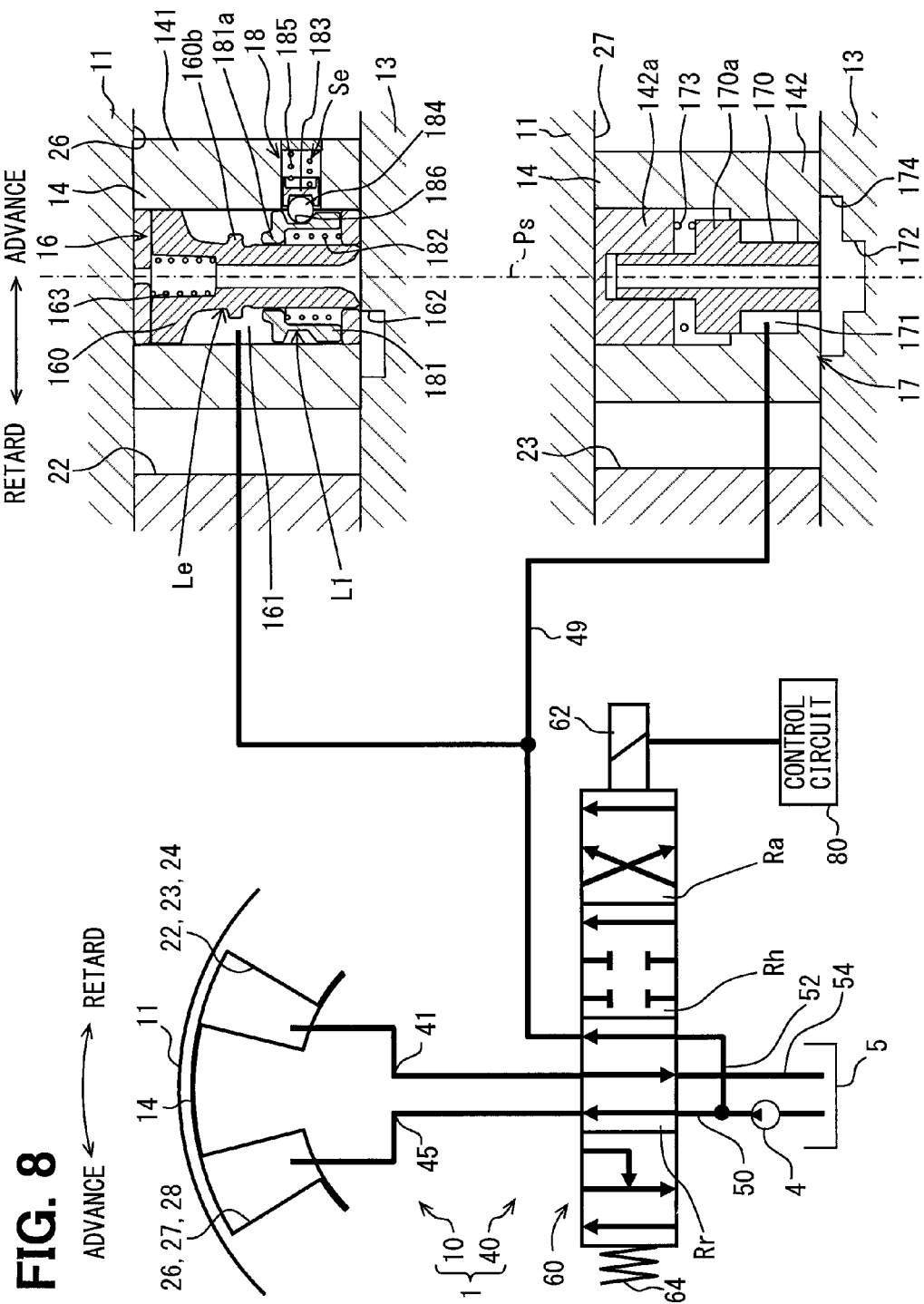
FIG. 8 is a schematic view to show still another action state different from FIGS. 5 to 7 of the valve timing adjusting device of FIG. 1.

As shown in FIGS. 1, 2, the vane 141 supports a main lock member 160, which is eccentric with respect to the rotary shaft 140 and is made of metal in the shape of a circular cylinder, in such a way that the main lock member 160 can reciprocate in the axial direction. The vane 141 forms a main lock release chamber 161 around the main lock member 160, the main lock release chamber 161 being formed in a ring-shaped space in which the working oil flows in and out. As shown in FIGS. 1, 5, when the working oil is discharged from the main lock release chamber 161, the main lock member 160 is fitted in a circular cylindrical main lock bore 162. When the main lock member 160 is fitted in the circular cylindrical main lock bore 162 in this manner, the main lock member 160 locks a rotation phase of the vane rotor 14 with respect to the housing rotor 11 (hereinafter simply referred to as "rotation phase") at a main lock phase Pm shown in FIG. 2. On the other hand, as shown in FIGS. 6 to 8, when the main lock member 160 receives the pressure of the working oil introduced into the main lock release chamber 161, the main lock member 160 is released from the main lock bore 162. When the main lock member 160 is released from the main lock bore 162 in this manner, the main lock member 160 releases the rotation phase from having been locked at the main lock phase Pm. In this regard, of movement positions in a direction in which the main lock member 160 reciprocates, a position Li in which the main lock member 160 is fitted in the main lock bore 162 as shown in FIG. 5 is referred to as "a fitting-in position Li", whereas a position Le in which the main lock member 160 is released from the main lock bore 162 as shown in FIGS. 6 to 8 is referred to as "a release position Le".

Figure 3:
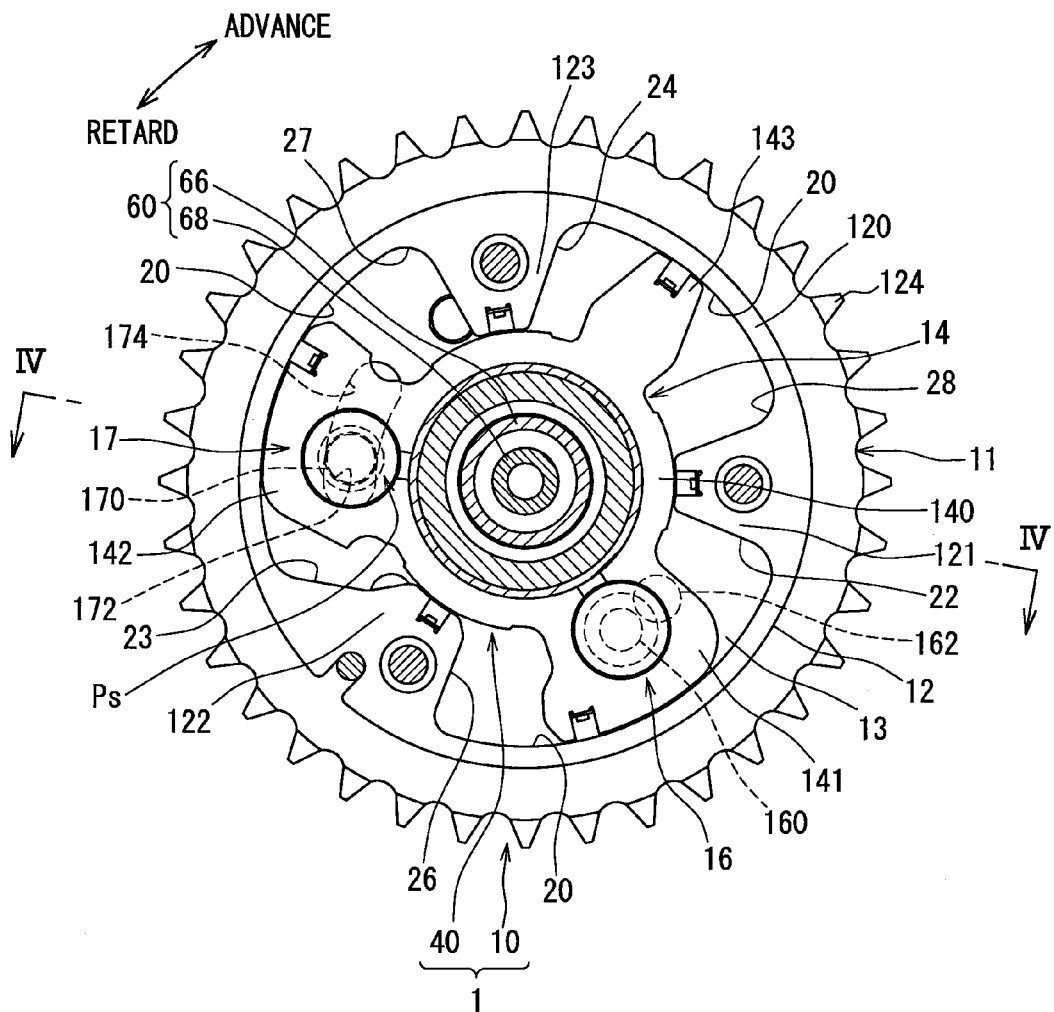
FIG. 3 is a section view to show an action state different from FIG. 2.
Figure 4:
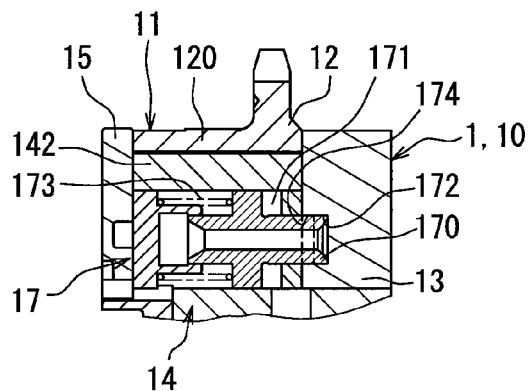
FIG. 4 is a section view taken on a line IV-IV of FIG. 3.

As shown in FIGS. 3, 4, the vane 142 supports a subordinate lock member 170, which is eccentric with respect to the rotary shaft 140 and is made of metal in the shape of a circular cylinder, in such a way that the subordinate lock member 170 can reciprocate in the axial direction. The vane 142 forms a subordinate lock release chamber 171 around the subordinate lock member 170, the subordinate lock release chamber 171 being formed in a ring-shaped space in which the working oil flows in and out. As shown in FIGS. 4, 7, when the working oil is discharged from the subordinate lock release chamber 171, the subordinate lock member 170 is fitted in a circular cylindrical subordinate lock bore 172. When the subordinate lock member 170 is fitted in the circular cylindrical subordinate lock bore 172 in this manner, the subordinate lock member 170 locks the rotation phase at a subordinate lock phase Ps shown in FIG. 3. On the other hand, as shown in FIGS. 5, 6 to 8, when the subordinate lock member 170 receives the pressure of the working oil introduced into the subordinate lock release chamber 171, the subordinate lock member 170 is released from the subordinate lock bore 172. When the subordinate lock bore 172 is released from the subordinate lock bore 172 in this manner, the subordinate lock member 170 releases the rotation phase from having been locked at the subordinate lock phase Ps.

In the rotation drive section 10 described above, the vane rotor 14 receives the pressure of the working oil, which flows in and out of the advance chambers 22, 23, 24 and the retard chambers 26, 27, 28, in the housing rotor 11. At this time, when the working oil is introduced into the advance chambers 22, 23, 24 and the working oil is discharged from the retard chambers 26, 27, 28 in the state where the rotation phase is released from being locked by the respective lock members 160, 170, the rotation phase is changed to an advance side (for example, change from FIG. 2 to FIG. 3). As a result, the valve timing is adjusted to an advance side. On the other hand, when the working oil is introduced into the retard chambers 26, 27, 28 and the working oil is discharged from the advance chambers 22, 23, 24 in the state where the rotation phase is released from being locked by the respective lock members 160, 170, the rotation phase is changed to a retard side (for example, change from FIG. 3 to FIG. 2). Furthermore, when the working oil is trapped in the advance chambers 22, 23, 24 and in the retard chambers 26, 27, 28 in the state where the rotation phase is released from being locked by the respective lock members 160, 170, a change in the rotation phase is inhibited and hence the valve timing is held nearly constant.

(Control Section)

In the control section 40 shown in FIGS. 1, 5 to 8, a main advance passage 41 is formed in the rotary shaft 140 and communicates with the advance chambers 22, 23, 24. A main retard passage 45 is formed in the rotary shaft 140 and communicates with the retard chambers 26, 27, 28. A lock release passage 49 is formed in the rotary chamber 140 and communicates with the lock release chambers 161, 171.

A main supply passage 50 formed in the rotary shaft 140 communicates with a pump 4 as a supply source through a transport passage 3. Here, the pump 4 is a mechanical pump, which receives the engine torque and is driven by the engine torque while the internal combustion engine is operated, and while the internal combustion engine is operated, the pump 4 continuously discharges the working oil sucked from a drain pan 5. The transport passage 3 formed through the camshaft 2 and a bearing thereof can always communicate with a discharge port of the pump 4 regardless of the rotation of the camshaft 2. In this way, when the internal combustion engine is started by cranking and is completely combusted, the supply of the working oil to the main supply passage 50 is started, whereas when the internal combustion engine is stopped, the supply of the working oils is stopped.

A subordinate supply passage 52 is formed in the rotary shaft 140 and is branched from the main supply passage 50. The subordinate supply passage 52 receives the working oil, which is supplied from the pump 4, through the main supply passage 50. A drain recovery passage 54 is formed in the outside of the rotation drive section 10 and the camshaft 2. The drain recovery passage 54 is opened to the atmosphere together with the drain pan 5 as a drain recovery part and can discharge the working oil to the drain pan 5.

As shown in FIGS. 1, 2, a control valve 60 is a spool valve utilizing a driving force, which is generated by a linear solenoid 62, and a restoring force, which is generated by a biasing member 64 in a direction opposite to the driving force and reciprocates a spool 68 in a sleeve 66 in the axial direction. When the spool 68 is moved to a lock region R1 shown in FIGS. 5 to 7, the working oil from the pump 4 is introduced into the retard chambers 26, 27, 28 and the working oil in the advance chambers 22, 23, 24 and the lock release chambers 161, 171 is discharged to the drain pan 5. When the spool 68 is moved to a retard region Rr shown in FIG. 8, the working oil in the advance chambers 22, 23, 24 is discharged to the drain pan 5 and the working oil from the pump 4 is introduced into the retard chambers 26, 27, 28 and the lock release chambers 161, 171. When the spool 68 is moved to an advance region Ra shown in FIG. 8, the working oil in the retard chambers 26, 27, 28 is discharged to the drain pan 5 and the working oil from the pump 4 is introduced into the advance chambers 22, 23, 24 and the lock release chambers 161, 171. When the spool 68 is moved to a holding region Rh shown in FIG. 8, the working oil from the pump 4 is introduced into the lock release chambers 161, 171 and at the same time the working oil is trapped in the advance chambers 22, 23, 24 and the retard chambers 26, 27, 28.

A control circuit 80 is a microcomputer electrically connected to the linear solenoid 62, the engine switch SW, and various kinds of electric components of the internal combustion engine, which are shown in FIG. 1, and constructs the idle stop system ISS. The control circuit 80 controls the operation of the internal combustion engine according to a computer program, the operation including the passing of current through the linear solenoid 62 and an idle stop.

(Main Lock Mechanism)

Next, as shown in FIG. 1, a main lock mechanism 16 as "a main lock portion", which is made by combining a main elastic member 163 with a set of main lock elements 160, 161, 162, will be described in detail.

Figure 11:
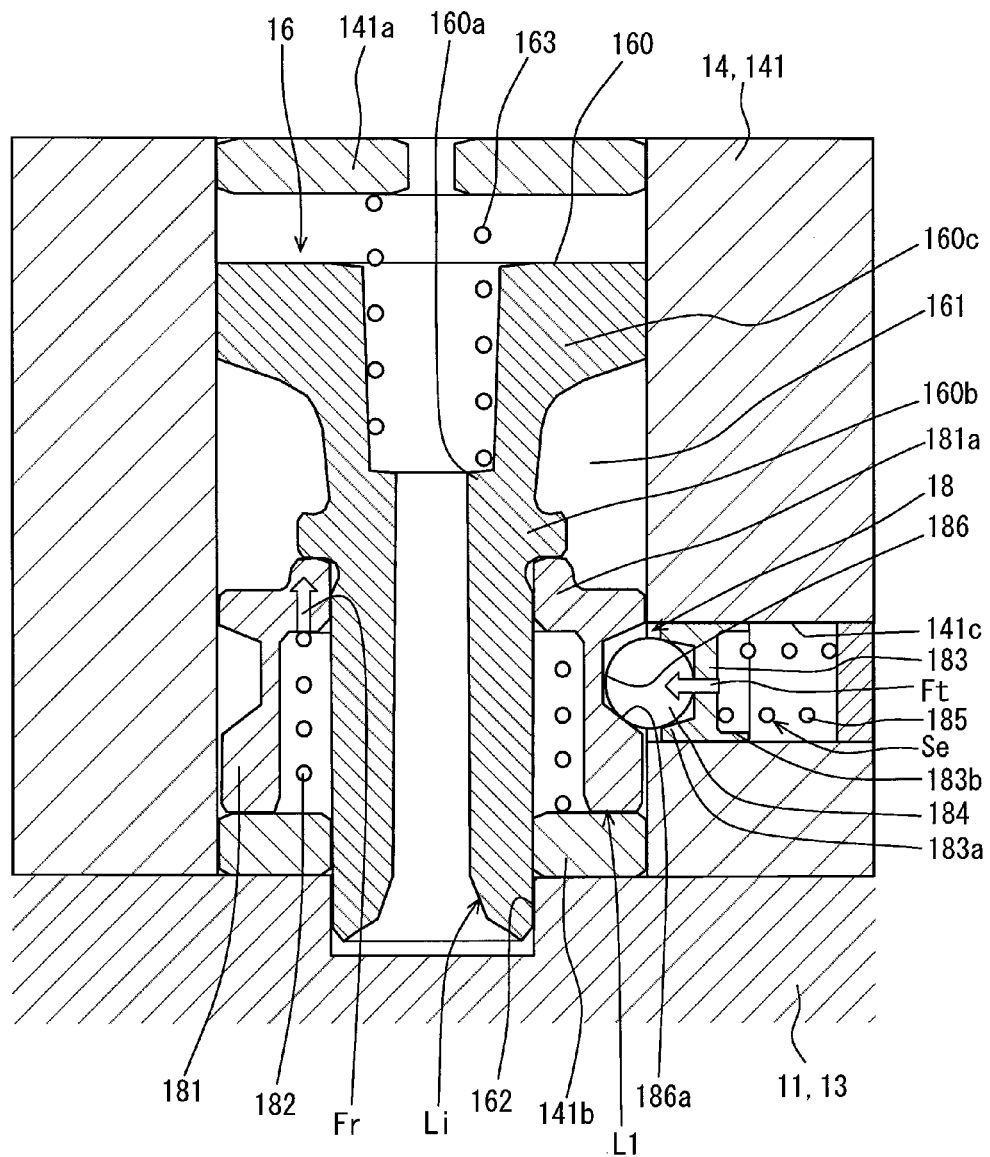
FIG. 11 is a section view, on an enlarged scale, to show a main part of the valve timing adjusting device of FIG. 1.

As shown in FIG. 11, the main elastic member 163 is a coil spring made of metal and is housed in the vane 141. The main elastic member 163 is interposed in the axial direction between a spring receiving part 141a on a side opposite to the rear plate 13 and a spring receiving part 160a of the main lock member 160 in the vane 141. The main elastic member 163 interposed in this manner generates a restoring force in such a way as to bias the main lock member 160 to a rear plate 13 side. Hence, at the main lock phase Pm shown in FIGS. 5, 6, the restoring force of the main elastic member 163 is applied toward a main lock bore 162 side, that is, toward a fitting-in position Li side of the main lock member 160. Further, a force for driving the main lock member 160, which is produced by the pressure applied from the main lock release chamber 161, against the restoring force of the main elastic member 163 is applied toward a side opposite to the main lock bore 162, that is, toward the release position Le side of the main lock member 160 at the main lock phase Pm.

Figure 9:
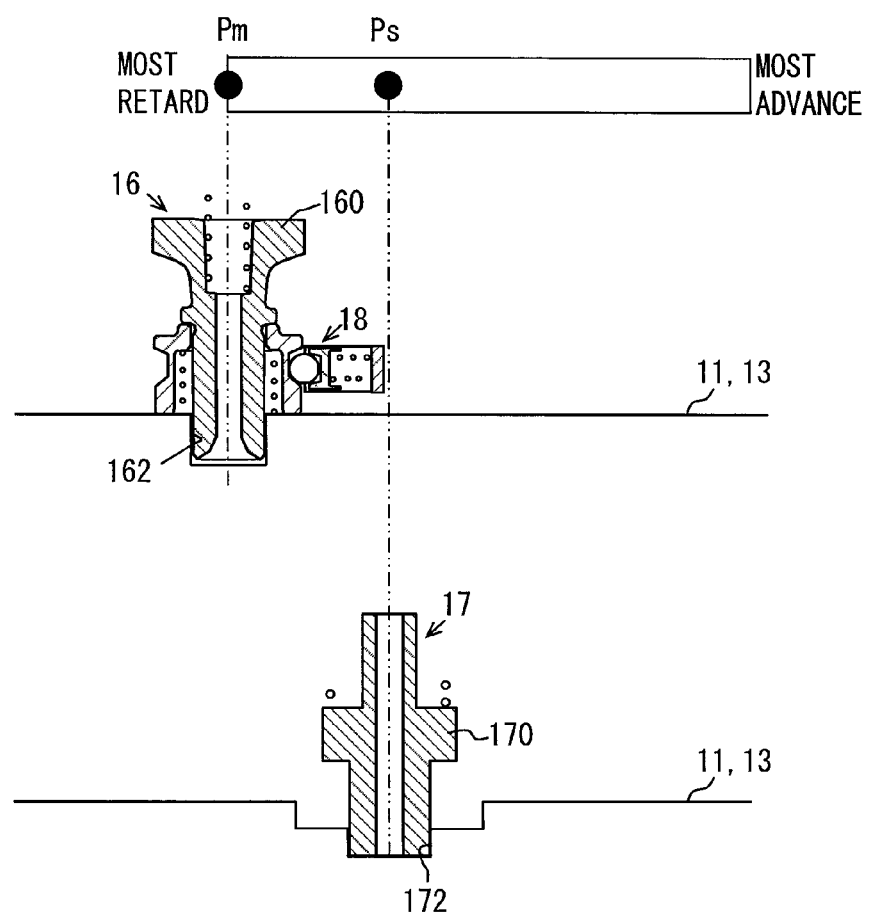
FIG. 9 is a schematic view to illustrate a feature of the valve timing adjusting device of FIG. 1.
Figure 10:
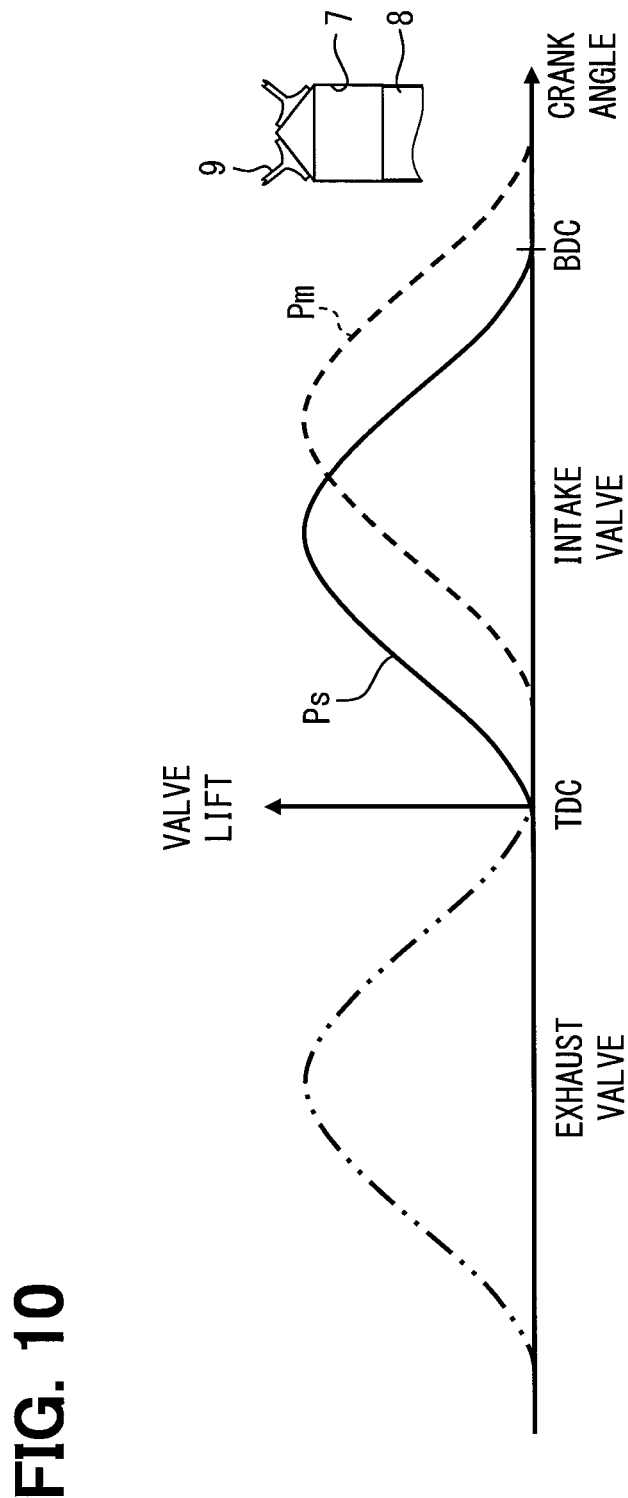
FIG. 10 is a characteristic chart to illustrate a feature of the valve timing adjusting device of FIG. 1.

In the construction described above, the main lock phase Pm realized by the main lock member 160 being fitted in the min lock bore 162 is previously set at the most retarded phase shown in FIGS. 2, 9. In particular, the main lock phase Pm of the present embodiment, as shown in FIG. 10, is previously set at a rotation phase for closing the intake valve 9 at a timing later than a timing when the piston 8 in the cylinder 7 of the internal combustion engine reaches a bottom dead center BDC.

(Lock Control Mechanism)

Next, as shown in FIG. 1, a lock control mechanism 18 as "a lock control portion" assembled to a main lock member 160 side will be described in detail.

As shown in FIGS. 5, 11, the lock control mechanism 18 includes a moving member 181, a control elastic member 182, a retainer member 183, a latch member 184, and a temperature sensing body 185.

As shown in FIG. 11, the moving member 181 made of metal is formed in the shape of a circular cylinder having a closed bottom and is coaxially arranged on an outer circumferential side of the main lock member 160. The moving member 181 has a latch opening part 186 opened on its outer circumferential face in the shape of a ring-shaped groove formed continuously in a circumferential direction. In the present embodiment, in the latch opening part 186 having a trapezoidal section, an inner face 186*a* on the rear plate 13 side is formed in a flat plane crossing (slanting with respect to) the axial direction of the moving member 181. Hereinafter, the inner face 186*a* is especially referred to as a latch inner face 186*a*.

As shown in FIG. 11, a bottom end part 181*a* on a side opposite to the rear plate 13 in the moving member 181 is fitted on the outside of the main lock member 160. The moving member 181 fitted on the outside of the main lock member 160 can be reciprocated in the axial direction and can be moved relatively to the main lock member 160. The moving member 181 forms the main lock release chamber 161 between itself and a collar part 160*c* of the main lock member 160 and is driven to the rear plate 13 side by the pressure applied from the main lock release chamber 161.

As shown in FIGS. 5 to 8, the moving member 181 is reciprocated between a first position L1 on the rear plate 13 side and a second position L2 on a side opposite to the first position L1. In the main lock phase Pm shown in FIGS. 5, 11, the moving member 181 at the first position L1 retains a flange-shaped retaining part 160*b* of the main lock member 160 by the bottom end part 181*a*, thereby positioning the main lock member 160 at the fitting-in position Li in which the main lock member 160 is fitted in the main lock bore 162. On the other part, as shown in FIGS. 6, 7, at the main lock phase Pm and other rotation phase, the moving member 181 at the second position L2 retains the retaining part 160*b* by the bottom end part 181*a*, thereby positioning the main lock member 160 at the release position Le in which the main lock member 160 is released from the main lock bore 162. Furthermore, as shown in FIG. 8, at the main lock phase Pm and the other rotation phase, the moving part 181 moved to the first position L1 allows the main lock member 160 to move to the release position Le with the retaining part 160*b* separated from the bottom end part 181*a*.

As shown in FIG. 11, the control elastic member 182 is a coil spring made of metal and is coaxially arranged on an inner circumferential side of the moving member 181 and on an outer circumferential side of the main lock member 160. The control elastic member 182 is interposed in the axial direction between a spring receiving part 141*b* on the rear plate 13 side and the bottom end part 181*a* of the moving member 181 in the vane 141. The control elastic member 182 in the interpolated state like this generates a restoring force Fr in such a way as to bias the moving member 181 to a side opposite to the rear plate 13, that is, to a second position L2 side in FIGS. 6, 7. Furthermore, against the restoring force Fr of the control elastic member 182, a force for driving the moving member 181 by the pressure applied from the main lock release chamber 161 is applied to the first position L1 side shown in FIGS. 5, 8, 11.

Here, as shown in FIG. 11, the restoring force Fr of the control elastic member 182 is applied along the axial direction of the moving member 181, so that the restoring force Fr becomes a biasing force in a direction crossing the latch inner face 186*a*. Further, the restoring force Fr of the control elastic member 182 is previously set in such a way that when the moving member 181 in the state of retaining the main lock member 160 is moved between the positions L1 and L2, the restoring force Fr becomes not less in magnitude than the restoring force of the main elastic member 163.

The retainer member 183 made of metal has a pair of retainer parts 183*a*, 183*b* each of which is formed in the shape of a circular cylindrical bore having a closed end. The respective retainer parts 183*a*, 183*b* have their opening parts directed to opposite sides and have their bottom parts coupled coaxially to each other. The retainer member 183 is fitted and inserted coaxially in the housing bore 141*c* formed in the shape of a circular cylindrical bore having a closed end in the vane 141 and can be reciprocated in the axial direction. In the fitted and inserted state like this, the retainer part 183*a* on a latch side is positioned closer to an opening part side of the housing bore 141*c* than the retainer part 183*b* on a biasing side. Here, an axial direction of the housing bore 141*c* in the present embodiment substantially corresponds with a radial direction of the moving member 181.

The latch part 184 made of metal is formed in a spherical shape and is inserted coaxially into the housing bore 141*c*. The latch part 184 is fitted and inserted in such a way as to be moved integrally with the inner circumferential side of the retainer part 183*a* on the latch side. The latch member 184 in the housing bore 141*c*, as shown in FIGS. 5, 8, 11, is moved also into a latch opening part 186 in the moving member 181 at the first position L1, thereby retaining the opening part 186, whereby the moving member 181 is latched. On the other hand, as shown in FIGS. 6, 7, the latch member 184 is pushed to the outside of the latch opening part 186 by the outer circumferential face of the moving member 181 moving to the second position L2 side, thereby being separated from the opening part 186, whereby the moving member 181 is unlatched. Here, as shown in FIG. 12, a moving range X of the latch member 184 ranges from a position in which the latch member 184 latches the moving member 181 to a position in which the latch member 184 unlatches the moving member 181.

The temperature sensing body 185 shown in FIG. 11 is formed of a shape-memory material which is restored to an original shape according to a temperature increase, for example, nickel-titanium (Ni—Ti) based alloy in the shape of a coil spring and has elasticity. The temperature sensing body 185 is housed coaxially in the housing bore 141*c* and is fitted and inserted in the inner circumferential side of the retainer part 183*b* on the biasing side, thereby being interposed in the axial direction between the bottom part of the housing bore 141*c* and the bottom part of the retainer part 183*b*. The temperature sensing body 185 in the interposed state like this generates a restoring force Ft in such a way as to bias the retainer member 183 and the latch member 184 to the moving member 181 side.

Figure 12:
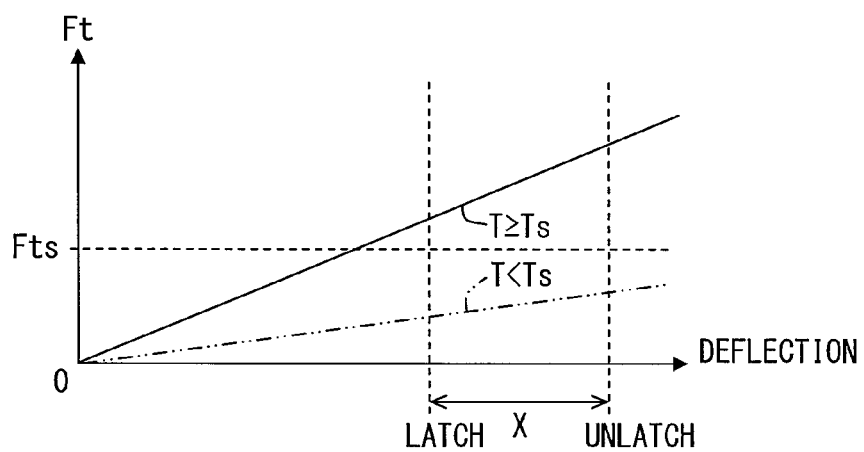
FIG. 12 is a graph to show a characteristic of a temperature sensing body of FIG. 11.
Figure 13:
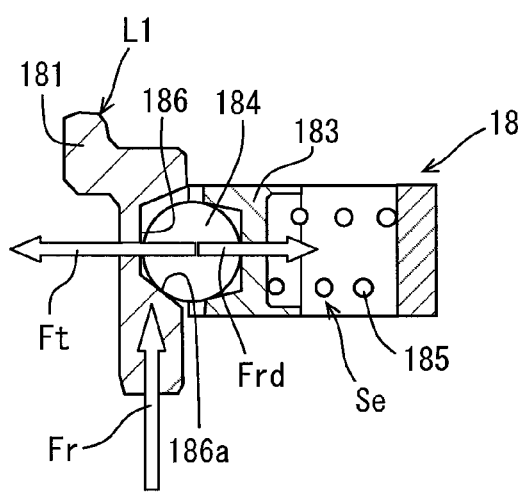
FIG. 13 is a schematic view to illustrate an action of a lock control mechanism of FIG. 11.
Figure 14A:
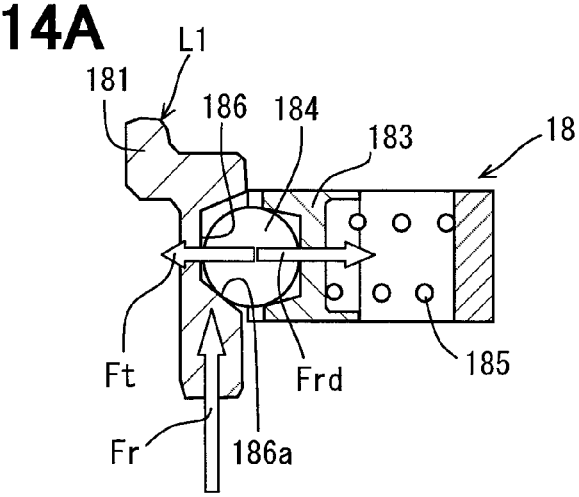
FIGS. 14A and 14B are schematic views to illustrate the action of the lock control mechanism of FIG. 11.

As shown in FIGS. 12 to 14, at an engine temperature T not less than a preset temperature Ts, the temperature sensing body 185 increases the restoring force Ft applied to the latch member 184 within the moving range X to a value not less than a present value Fts, whereas at the engine temperature T less than the preset temperature Ts, the temperature sensing body 185 decreases the restoring force Ft to a value less than the present value Fts. Here, the preset value Fts is previously set in such a way as to be substantially equal in magnitude to a component of force Frd that the latch member 184 receives in the axial direction (that is, in the radial direction of the moving member 181) from the latch inner face 186*a* in a state where the latch member 184 is pressed by the restoring force Ft on the latch inner face 186*a* in the moving member 181 at the first position L1 as shown in FIGS. 13, 14A. Hence, in the present embodiment, according to the adjustment of the restoring force Fr applied to the moving member 181 from the control elastic member 182 to thereby generate the component of force Frd, the preset value Fts is previously set at, for example, 3N or the like and the preset temperature Ts corresponding to the preset value Fts is previously set at a temperature within a range, for example, from 40 to 60° C.

In the lock control mechanism 18 described above, the state of the main lock member 160 is controlled according to the engine temperature T. Specifically, when the engine temperature T is not less than the preset temperature Ts, the restoring force Ft applied to the latch member 184 from the temperature sensing body 185 is increased to the preset value Fts or more. Hence, in the state shown in FIG. 13 in which the component of force Frd of the restoring force Fr is applied to the latch member 184 from the latch inner face 186a, the restoring force Ft becomes larger than the component of force Frd. As a result, the temperature sensing body 185 is changed to an expanded state Se as shown in FIGS. 5, 8, 11, 13, thereby pressing the latch member 184 into the latch opening part 186, whereby the moving member 181 is latched at the first position L1. Further, the moving member 181 latched at the first position L1 in this manner can retain the main lock member 160 at the fitting-in position Li by the bottom end part 181a at the main lock phase shown in FIG. 5. This retaining allows the main lock member 160 to be fitted in the main lock bore 162, that is, allows the rotation phase to be locked.

Figure 14B:
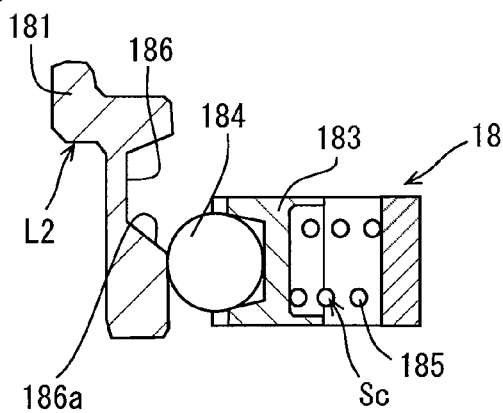

On the other hand, when the engine temperature T becomes less than the preset temperature Ts, the restoring force Ft applied to the latch member 184 from the temperature sensing body 185 is decreased to the preset value Fts or less. Hence, in the state shown in FIG. 14A in which the component of force Frd of the restoring force Fr is applied to the latch member 184 from the latch inner face 186a, the component of force Frd is more than the restoring force Ft. As a result, the moving member 181 presses the latch member 184 and moves to the second position L2. At this time, as shown in FIGS. 6, 7, 14B, while the latch member 184 presses the temperature sensing body 185 to thereby change the temperature sensing body 185 to a contracted state Sc, the whole of the latch member 184 itself is released to the outside of the latch opening part 186. Hence, the latch member 184 inhibited from being retained by the latch opening part 186 is brought into a state where the moving member 181 is unlatched. Furthermore, at the main lock phase Pm shown in FIG. 6, the unlatched moving member 181 presses the main lock member 160 onto the release position Le by the bottom end part 181a and at the same time can reach the second position L2. This reaching can release the main lock member 160 from having been fitted in the main lock bore 162, that is, release the rotation phase from having been locked.

(Subordinate Lock Mechanism)

Next, as shown in FIG. 4, a subordinate lock mechanism 17 as "a subordinate lock portion", which is made by combining a subordinate elastic member 173 and a limiting groove 174 with a set of subordinate lock elements 170, 171, 172, will be described in detail.

As shown in FIG. 5, the subordinate elastic member 173 is a coil spring made of metal and is housed in the vane 142. The subordinate elastic member 173 is interposed in the axial direction between a spring receiving part 142a on a side opposite to the rear plate 13 and a spring receiving part 170a of the subordinate lock member 170 in the vane 142. The subordinate elastic member 173 in the interpolated state like this generates a restoring force in such a way as to bias the subordinate lock member 170 to the rear plate 13 side. Hence, at a subordinate lock phase Ps shown in FIGS. 7, 8, the restoring force of the subordinate lock member 170 is applied toward the subordinate lock bore 172 side. Further, a force for driving the subordinate lock member 170, which is produced by the pressure applied from the subordinate lock release chamber 171, against the restoring force of the subordinate lock member 170 is applied toward a side opposite to the subordinate lock bore 172 at the subordinate lock phase Ps.

As shown in FIG. 5, the limiting groove 174 is formed in the rear plate 13 in the shape of a long bore extending in a rotation direction and having a closed end in the rear plate 13. The limiting groove 174 has a subordinate lock bore 172 opened in a groove bottom of a midway part thereof. When the subordinate lock member 170 moves into the limiting groove 174 on both sides in the rotational direction of the subordinate lock bore 172, this opening structure limits the rotation phase to a specified rotation phase region sandwiching the subordinate lock phase Ps. Moreover, when the rotation phase reaches the subordinate lock phase Ps to thereby fit the subordinate member 170 in the limiting groove 174 in the subordinate lock bore 172, it is realized for the rotation phase to be locked at the subordinate lock phase Ps shown in FIG. 7.

In the construction described above, the subordinate lock phase Ps realized by the subordinate lock member 170 being fitted in the subordinate lock bore 172 is previously set at an intermediate phase advanced more than the main lock phase Pm, as shown in FIGS. 3, 9. In particular, the subordinate lock phase Ps of the present embodiment, as shown in FIG. 10, is previously set at a rotation phase for closing the intake valve 9 at a timing when the piston 8 in the cylinder 7 of the internal combustion engine reaches the bottom dead center BDC or another timing near the timing.

(Application of Varying Torque to Vane Rotor)

Next, a varying torque applied to the vane rotor 14 from the camshaft 2 will be described.

Figure 15:
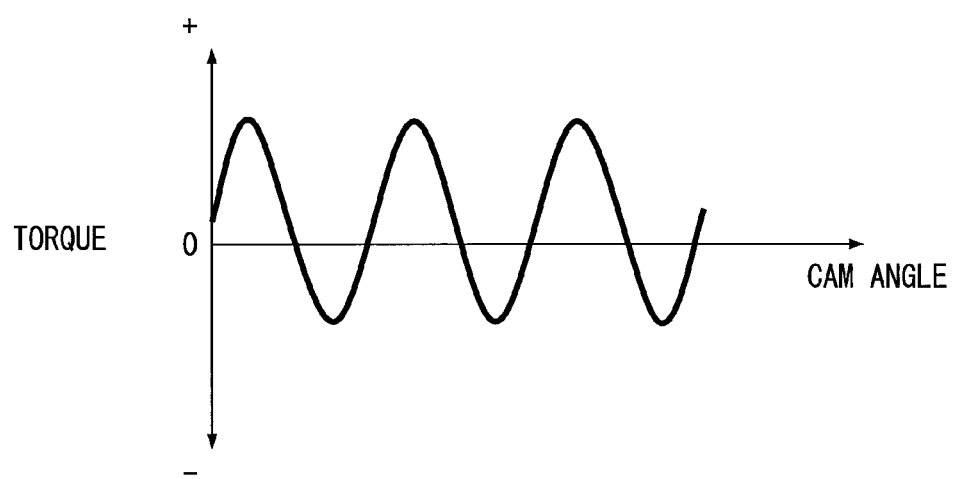
FIG. 15 is a characteristic chart to illustrate a varying torque applied to the valve timing adjusting device of FIG. 1.

While the internal combustion engine is operated, the vane rotor 14 has a varying torque applied thereto, the varying torque being caused by a spring reactive force or the like which is produced by the intake valve 9 opened or closed by the camshaft 2. As shown in FIG. 15 by way of example, the varying torque alternately varies between a negative torque applied to an advance side with respect to the housing rotor 11 and a positive torque applied to a retard side with respect to the housing rotor 11. As to the varying torque of the present embodiment, a peak torque of the positive torque is larger than a peak torque of the negative torque because of friction between the camshaft 2 and its bearing and an average torque of the positive torque and the negative torque is biased to a positive torque side (retard side).

(Biasing Structure of Vane Rotor)

Next, a biasing structure for biasing the vane rotor 14 toward the subordinate lock phase Ps will be described.

In the rotation drive section 10 shown in FIG. 1, the respective rotors 11, 14 have retaining pins 110, 146 fixed thereto. The first retaining pin 110 is formed in the shape of a circular cylinder protruded to a side opposite to the shoe ring 12 in the axial direction in the front plate 15. The second retaining pin 146 is formed in the shape of a circular cylinder protruded to the front plate 15 side in the axial direction from an arm plate 147 substantially parallel to the front plate 15 in the rotary shaft 140. These retaining pins 110, 146 are arranged at positions which are eccentric by a substantially same distance from a center line of rotation of the rotors 11, 14 and which are shifted from each other in the axial direction.

An advance elastic member 19 is arranged between the front plate 15 and the arm plate 147. The advance elastic member 19 is a spiral spring made by winding a metal wire on a substantially same plane and its spiral center corresponds with the center line of rotation of the rotors 11, 14. An inner circumferential end part of the advance elastic member 19 is wound on the outer circumferential part of the rotary shaft 140. An outer circumferential end part of the advance elastic member 19 is bent in the shape of a letter U to thereby form a retained part 190. The retained part 190 can be retained by the retaining pin corresponding to the rotation phase of the retaining pins 110, 146.

In the construction described above, in a state where the rotation phase is changed to the retard side more than the subordinate lock phase Ps, that is, between the lock phases Ps and Pm, the retained part 190 of the advance elastic member 19 is retained by the first retaining pin 110. At this time, the second retaining pin 146 is released from the retained part 190, so that a restoring force generated when the advance elastic member 19 is elastically twisted and deformed is applied to the vane rotor 14 as a rotation torque on the advance side with respect to the housing rotor 11. That is, the vane rotor 14 is biased to the subordinate lock phase Ps on the advance side. Here, between the lock phases Ps and Pm, the restoring force of the advance elastic member 19 is previously set in such a way as to be larger than an average value of a varying torque biased to the retard side (see FIG. 15). On the other hand, in a state where the rotation phase is changed to the advance side from the subordinate lock phase Ps, the retained part 190 is retained by the second retaining pin 146. At this time, the first retaining pin 110 is released from the retained part 190, so that a force with which the advance elastic member 19 biases the vane rotor 14 is limited.

(Action)

Next, an action of the first embodiment will be described in detail.

(1) Normal Operation

Figure 16:
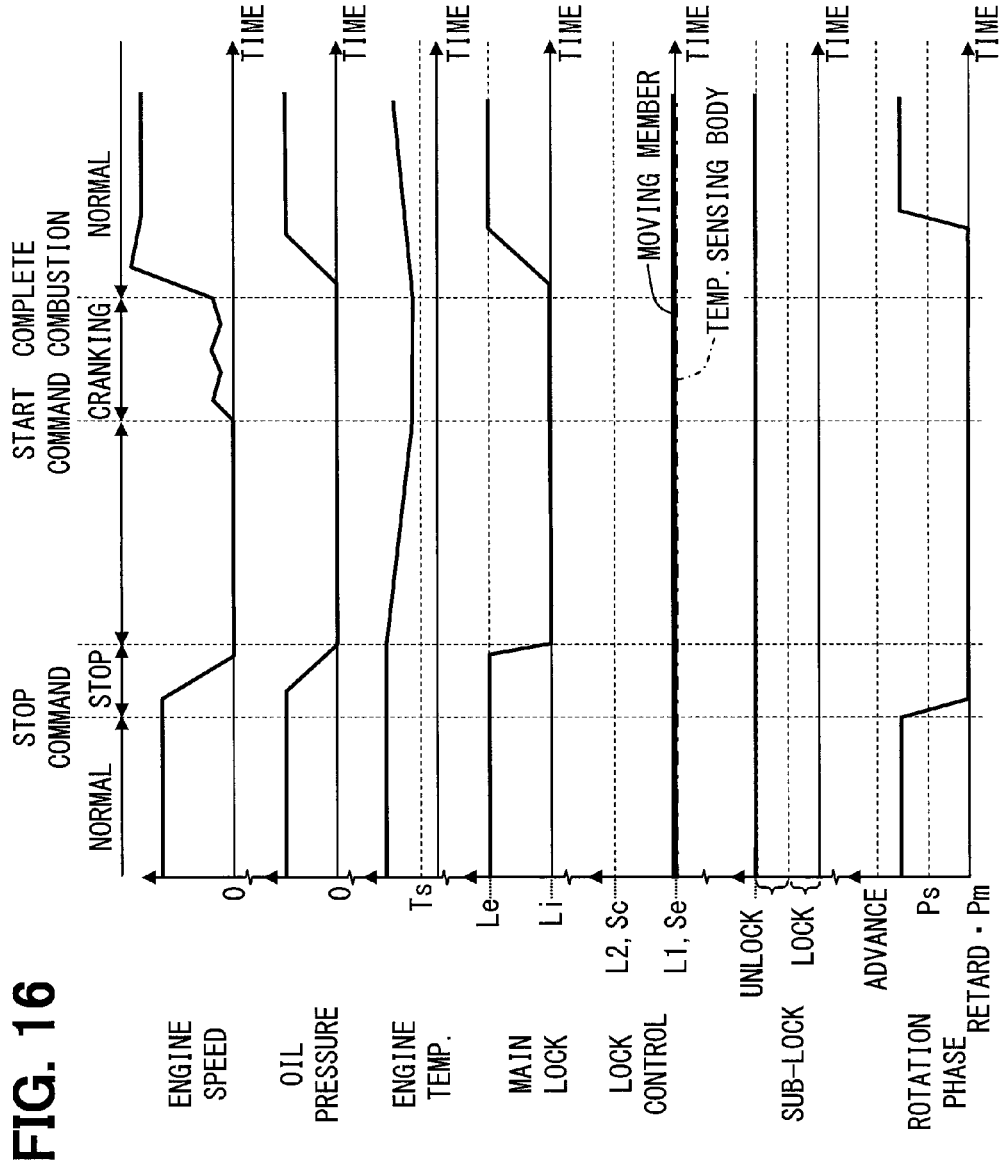
FIG. 16 is a graph to show an action example of the valve timing adjusting device of FIG. 1.
Figure 17:
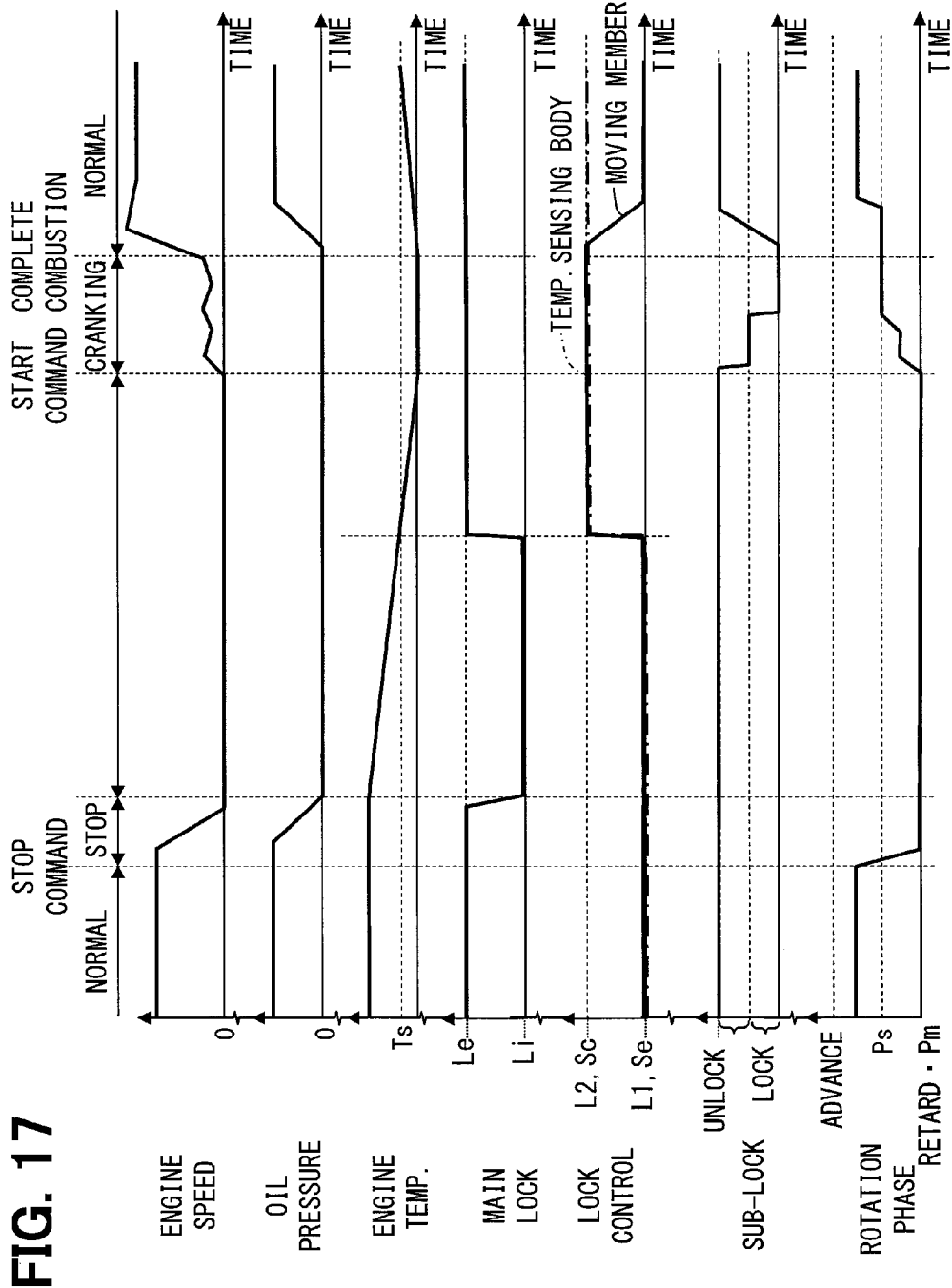
FIG. 17 is a graph to show another action example different from FIG. 16 of the valve timing adjusting device of FIG. 1.

While the internal combustion engine is normally operated after it is started and completely combusted, as shown in FIGS. 16, 17, the working oil is continuously supplied from the pump 4 at a high pressure according to a rotation speed of the internal combustion engine. As a result, the respective lock members 160, 170 are moved to the release position Le from the lock bores 162, 172 by the pressure of the working oil introduced into the respective lock release chambers 161, 171, whereby the rotation phase is held released from being locked at the respective lock phases Pm, Ps (see FIG. 8). In this state, by changing the movement position of the spool 68 to any one of regions Rr, Ra, Rh, the valve timing can be appropriately adjusted.

In this regard, a state in which the rotation phase is released from being locked at the main lock phase Pm is held by the pressure of the working oil applied to the main lock member 160 from the main lock release chamber 161 regardless of the movement position of the moving member 181. However, in this state, the moving member 181 receives high pressure from the working oil in the main lock release chamber 161 during the normal operation and hence moves against the restoring force Fr generated by the control elastic member 182, thereby being positioned at the first position L1 (FIG. 8). Hence, when the engine temperature T becomes not less than the preset temperature Ts by the normal operation, the moving member 181 is latched at the first position L1.

(2) Stop and Start

When the internal combustion engine operated normally, as shown in FIGS. 16, 17, is stopped according to a stop command such as an off command of the engine switch SW or an idle stop command of the idle stop system ISS, the spool 68 is moved to the lock region R1 before the internal combustion engine is brought into a state of inertia rotation by a fuel cut. At this time, the working oil is continuously supplied from the pump 4 at a high pressure according to the rotation speed of the internal combustion engine. Hence, the rotation phase is changed to the main lock phase Pm as the most retarded phase by the pressure of the working oil in the retard chambers 26, 27, 28.

When the internal combustion engine is brought into the state of inertia rotation after the rotation phase is changed to the main lock phase Pm, the pressure of the working oil supplied from the pump 4, as shown in FIGS. 16, 17, is gradually decreased according to the speed of the inertia rotation. As a result, the internal combustion engine is brought into a stop state at the main lock phase Pm.

In a warm stop state where the engine temperature T becomes not less than the preset temperature Ts as shown in FIG. 16 during the stop of the internal combustion engine, the restoring force Ft becomes not less than the present value Fts and hence the temperature sensing body 185 is changed to the expanded state Se, whereby the moving member 181 is latched at the first position L1. Hence, the main lock member 160, which receives the restoring force of the main elastic member 163 in a state where the pressure of the main lock release chamber 161 is vanished, is brought into a state where the main lock member 160 is moved to the fitting-in position Li in which the main lock member 160 is fitted in the main lock bore 162 (FIG. 5). Moreover, at this time, the subordinate lock member 170, which receives the restoring force of the subordinate elastic member 173 in a state where the pressure of the subordinate lock release chamber 171 is vanished, is put into contact with the rear plate 13 on the outside of the subordinate lock bore 172 and the limiting groove 174 (FIG. 5). As a result of the movement and the contact like this, the rotation phase is locked at the main lock phase Pm.

Thereafter, at the time of warm starting in which the cranking of the internal combustion engine is started at a temperature not less than the present temperature Ts according to a start command such as an on command of the engine switch SW or a restart command of the idle stop system ISS, as shown in FIG. 16, the moving member 181 is held latched at the first position L1. At this time, there is brought about the state where the movement position of the spool 68 is held in the lock region R1 and where the supply of the working oil from the pump 4 is substantially stopped. From these states, the main lock member 160, which receives the restoring force of the main subordinate elastic member 163 in the state where the pressure of the main lock release chamber 161 is vanished, holds the fitting-in position Li in which the main lock member 160 is fitted in the main lock bore 162 (FIG. 5). Moreover, the subordinate lock member 170, which receives the restoring force of the subordinate elastic member 173 in a state where the pressure of the subordinate lock release chamber 171 is vanished, is put into contact with the rear plate 13 on the outside of the subordinate lock bore 172 and the limiting groove 174 (FIG. 5). As a result of the movement and the contact like this, the internal combustion engine is completely combusted in the state where the rotation phase is locked at the main lock phase Pm.

In contrast to the above state, in a cold stop state caused after the engine temperature T becomes less than the preset temperature Ts as shown in FIG. 17 during the stop of the internal combustion engine, the restoring force Ft becomes less than the present value Fts and hence the temperature sensing body 185 is changed to a contracted state Sc according to the movement to the second position L2 of the moving member 181, whereby the moving member 181 is unlatched. Hence, in the state where the pressure of the main lock release chamber 161 is vanished, against the restoring force of the main elastic member 163, the main lock member 160 is moved to the release position Le in which the main lock member 160 is released from the main lock bore 162 (FIG. 6). Moreover, at this time, the subordinate lock member 170, which receives the restoring force of the subordinate elastic member 173 in the state where the pressure of the subordinate lock release chamber 171 is vanished, is put into contact with the rear plate 13 on the outside of the subordinate lock bore 172 and the limiting groove 174 (FIG. 6). As a result of the movement and the contact like this, there is brought about the state where the rotation phase is released from being locked at the respective lock positions Pm, Ps.

Thereafter, at the time of cold starting in which the cranking of the internal combustion engine is started at a temperature less than the present temperature Ts according to a start command such as the on command of the engine switch SW or the restart command of the idle stop system ISS, as shown in FIG. 17, the moving member 181 is held moved to the second position L2. This is because there is brought about the state where the movement position of the spool 68 is held in the lock region R1 and where the supply of the working oil from the pump 4 is substantially stopped. From these states, in the state where the pressure of the main lock release chamber 161 is vanished, the main lock member 160 holds the release position Le, in which the main lock member 160 is released from the main lock bore 162, against the restoring force of the main elastic member 163 (FIG. 6). Moreover, the subordinate lock member 170, which receives the restoring force of the subordinate elastic member 173 in the state where the pressure of the subordinate lock release chamber 171 is vanished, is put into contact with the rear plate 13 on the outside of the subordinate lock bore 172 and the limiting groove 174 (FIG. 6).

In this way, the vane rotor 14 at the time of cold starting in which the rotation phase is released from being locked at the respective lock phases Pm, Ps is rotated relatively to the advance side with respect to the housing rotor 11 by the negative torque applied thereto, thereby advancing the rotation phase from the main lock phase Pm. As a result, the subordinate lock member 170, which receives the restoring force of the subordinate elastic member 173 in the state where the pressure of the subordinate lock release chamber 171 is vanished, first comes into the limiting groove 174. In this way, even if the vane rotor 14 when the positive torque is applied thereto is rotated relatively to the retard side with respect to the housing rotor 11, the return of the rotation phase to the main lock phase Pm is limited as shown in FIG. 17.

Furthermore, thereafter, when the negative torque is applied to the vane rotor 14 to thereby further advance the rotation phase to the subordinate phase Ps, the subordinate lock member 170, which receives the restoring force of the subordinate elastic member 173 in the state where the pressure of the subordinate lock release chamber 171 is vanished, is fitted in the subordinate lock bore 172 (FIG. 7). At this time, in the state where the pressure of the main lock release chamber 161 is vanished, the main lock member 160 holds the release position Le, in which the main lock member 160 is released from the main lock bore 162, against the restoring force of the main elastic member 163 (FIG. 7). As a result of the fitting-in and the holding of the release position like this, the internal combustion engine is completely combusted in the state where the rotation phase is locked at the subordinate lock phase Ps as shown in FIG. 17.

(Operation and Effect)

Figure 18:
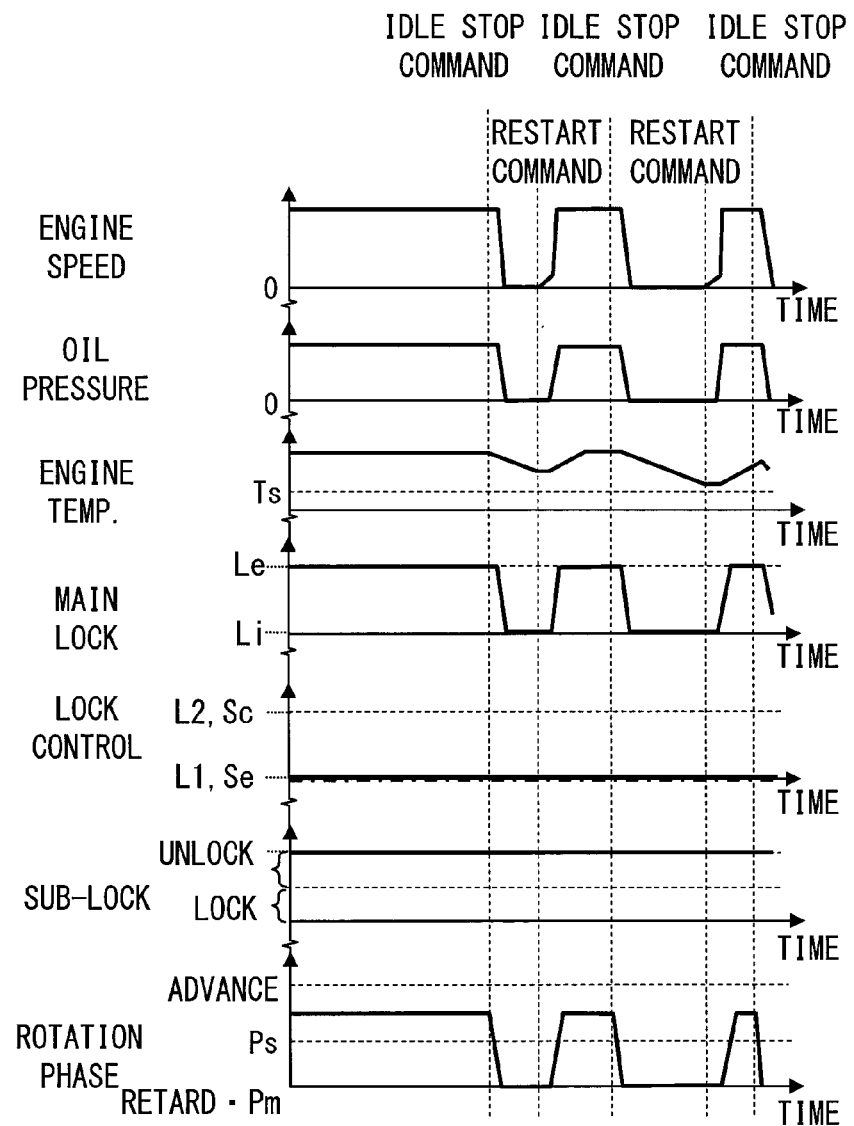
FIG. 18 is a graph to show an operation and an effect of the valve timing adjusting device of FIG. 1.

According to the first embodiment described above, in the warm stop state during which the engine temperature T becomes not less than the preset temperature Ts in the stopped internal combustion engine, the temperature sensing body 185 is changed to the expanded state Se. In this way, the moving member 181 is latched at the first position L1 for positioning the main lock member 160, so that the main lock member 160 is allowed to be fitted in the main lock bore 162 at the main lock phase Pm. That is, the rotation phase is allowed to be locked at the main lock phase Pm. Here, at the main lock phase Pm in which the intake valve 9 is closed at a timing later than a timing when the piston 8 in the cylinder 7 reaches the bottom dead center BDC, at the time of the next starting of the internal combustion engine, gas in the cylinder 7 is pushed out into an intake air system according to the lift-up of the piston 8 after reaching the bottom dead center, so that an actual compression ratio is decreased (decompression effect). Hence, at the time of the warm starting after the warm stop state in which the engine temperature T becomes not less than the preset temperature Ts, for example, even in the case where the restarting of the internal combustion engine by the idle stop system ISS is frequently repeated as shown in FIG. 18, the moving member 181 is positioned at the first position L1 to thereby hold the rotation phase locked at the main lock phase Pm, whereby the occurrence of malfunction in starting can be inhibited.

In contrast to this, in the cold stop state caused after the engine temperature T becomes less than the preset temperature Ts in the stopped internal combustion engine, the temperature sensing body 185 is changed to the contracted state Sc. The moving member 181 unlatched at the first position L1 in this state is moved to the second position L2 for positioning the main lock member 160, so that the main lock member 160 is released from being fitted in the main lock bore 162 at the main lock phase Pm. That is, the rotation phase is released from being locked at the main lock phase Pm. Hence, at the time of the next starting of the internal combustion engine, the negative torque of the varying torque from the camshaft 2 is applied to the vane rotor 14 and hence the vane rotor 14 is rotated relatively to the advance side with respect to the housing rotor 11. As a result, when the rotation phase is changed to the subordinate phase Ps advanced further than the main lock phase Pm, the subordinate lock member 170 is fitted in the subordinate lock bore 172 to thereby lock the rotation phase at the subordinate lock phase Ps, whereby the timing of closing the intake valve 9 can be made as early as possible. In this way, the amount of gas pushed out of the cylinder 7 is decreased and the temperature of the gas is increased together with the actual compression ratio. Hence, even at the time of the cold starting after the cold stop state in which the engine temperature T becomes less than the preset temperature Ts, for example, at the time of starting after a vehicle is left unattended for a long time under an extremely cold environment or at the time of restarting in the case where the driving of an engine is finished with the engine temporarily held stopped by the idle stop system ISS, ignitability can be improved and startability can be ensured.

According to the first embodiment described above, starting suitable to the engine temperature T can be realized.

Here, in particular, according to the first embodiment, at the main lock phase Pm in the warm stop state, the latch member 184 latches the latch opening part 186 to thereby surely realize the latch of allowing the rotation phase to be locked at the main lock phase Pm. On the other hand, at the main lock phase Pm in the cold stop state, the latch member 184 is inhibited from latching the latch opening part 186 to thereby surely realize the unlatch of releasing the rotation phase from being locked at the main lock phase Pm. In this way, the switching of the rotation phase to a rotation phase suitable for the warm starting after the warm stop and for the cold starting after the cold stop can be accurately realized.

Furthermore, according to the first embodiment, at the main lock phase Pm in the warm stop state, the temperature sensing body 185 made of the shape-memory material has its shape restored to the expanded state Se according to a temperature increase, thereby pressing the latch member 184, whereby the latch member 184 is latched by the lath opening part 186. As a result, the moving member 181 is latched at the first position L1 in which the rotation phase is allowed to be locked at the main lock phase Pm. On the other hand, at the main lock phase Pm in the cold stop state, the latch member 184 receives the component of force Frd of the restoring force Fr from the inner face 186a of the latch opening part 186 crossing the direction of the restoring force Fr and presses the temperature sensing body 185 to the contracted state Sc and is released from the latch opening part 186. As a result, the moving member 181, which is inhibited from being retained by the latch opening part 186 and hence is unlatched, receives the restoring force Fr, whereby the moving member 181 is moved to the second position L2 in which the main lock member 160 is released from being fitted in the main lock bore 162, that is, the second position L2 in which the rotation phase is released from being locked at the main lock phase Pm. According to the above operation, accuracy in the switching of the rotation phase to a rotation phase suitable for the warm starting after the warm stop and for the cold starting after the cold stop can be enhanced.

In addition, according to the first embodiment, the vane rotor 14 at the rotation phase between the main lock phase Pm and the subordinate lock phase Ps is biased to the advance side with respect to the housing rotor 11 by the advance elastic member 19. Hence, the vane rotor 14 biased by the advance elastic member 19 at the time of cold starting of the internal combustion engine can quickly change the rotation phase with respect to the housing rotor 11 to the subordinate lock phase Ps together with the varying torque applied thereto. According to this, in the internal combustion engine at the time of cold starting, the time required from the starting of cranking for generating the varying torque to the locking of the rotation phase at the subordinate lock phase Ps can be shortened. Hence, in particular, reliability in the cold starting after the cold stop can be enhanced.

Second Embodiment

Figure 19:
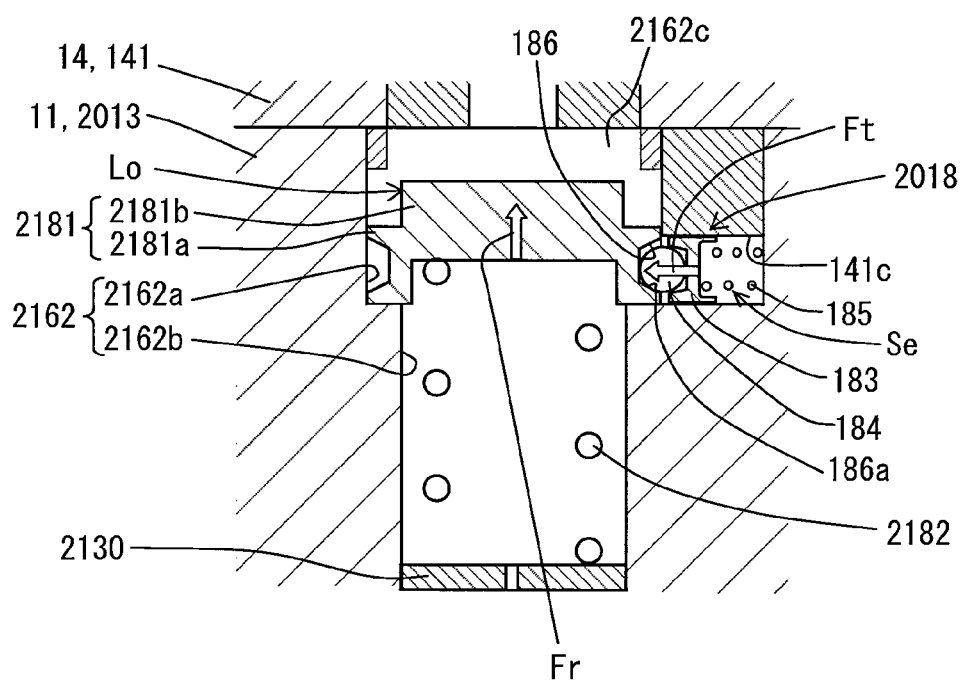
FIG. 19 is a section view, on an enlarged scale, to show a main part of a valve timing adjusting device according to a second embodiment of the present invention.

As shown in FIG. 19, a second embodiment of the present invention is a modified example of the first embodiment.
(Lock Control Mechanism)

A lock control mechanism 2018 as "the lock control portion" is assembled on a main lock bore 2162 side. The lock control mechanism 2018 has a moving member 2181 and a control elastic member 2182 which are different from the first embodiment.

The moving member 2181 made of metal is formed in the shape of a two-stepped circular column and is housed coaxially in the main lock bore 2162 formed in the shape of a two-stepped circular cylinder. The moving member 2181 has a small-diameter moving part 2181b positioned closer to a vane rotor 14 side than a large-diameter moving part 2181a. The large-diameter moving part 2181a has the latch opening part 186 opened in the outer circumferential face thereof, the latch opening part 186 having the latch inner face 186a as is the case of the first embodiment. The large-diameter moving part 2181a is fitted and inserted in a large-diameter bore part 2162a on a vane rotor 14 side of the main lock bore 2162, whereas the small-diameter moving part 2181b is inserted in the large-diameter bore part 2162a with a play. The moving member 2181 fitted and inserted and inserted with a play in this way, as shown in FIGS. 20 to 23, can be reciprocated between a closing position Lc and an opening position Lo.

Figure 21:
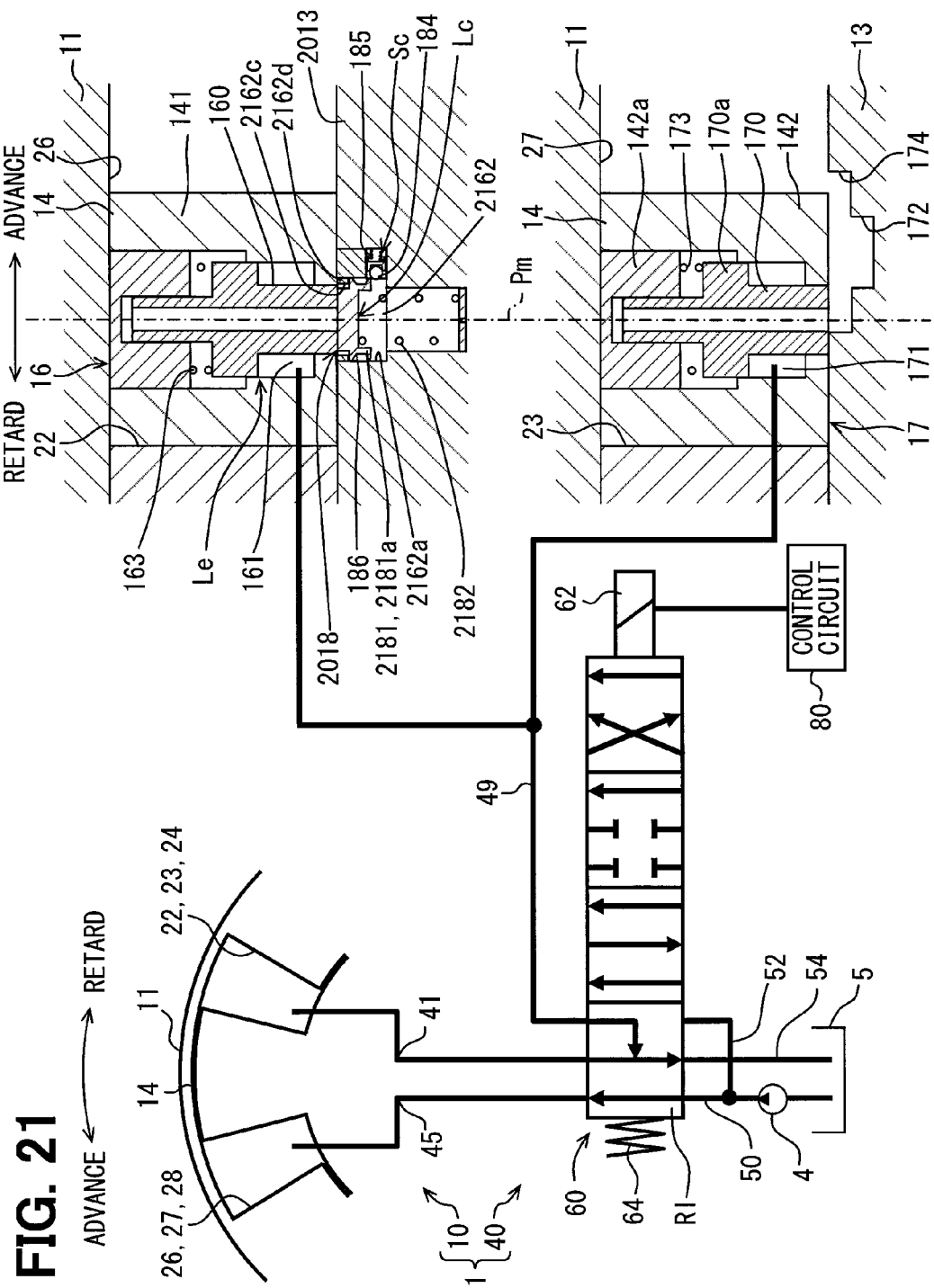
FIG. 21 is a schematic view to show another action state different from FIG. 20 of the valve timing adjusting device of FIG. 19.
Figure 22:
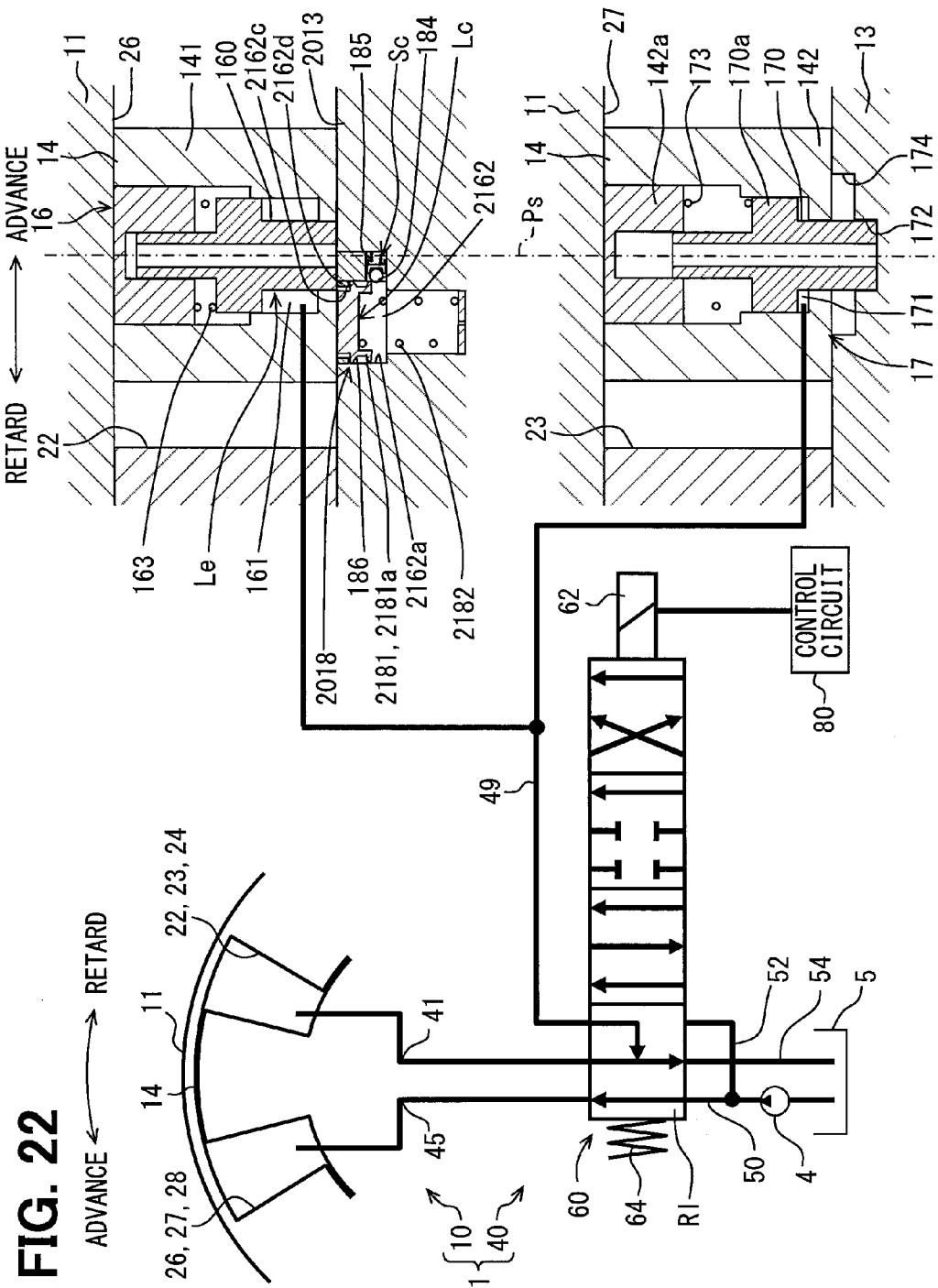
FIG. 22 is a schematic view to show still another action state different from FIGS. 20, 21 of the valve timing adjusting device of FIG. 19.

As shown in FIGS. 21, 22, when the moving member 2181 is moved to the closing position Lc, the moving member 2181 substantially closes an opening part 2162c on the vane rotor 14 side of the large-diameter bore part 2162a. With the moving member 2181 closing the opening part 2162c in this way, at the main lock phase Pm shown in FIG. 21, the main lock member 160 is put into contact with the moving member 2181 at the release position Le, whereby the main lock member 160 is released from being fitted in the main lock bore 2162. At this time, in the present embodiment, the large-diameter moving part 2181a is retained by a stopper part 2162d provided in the opening part 2162c.

Figure 20:
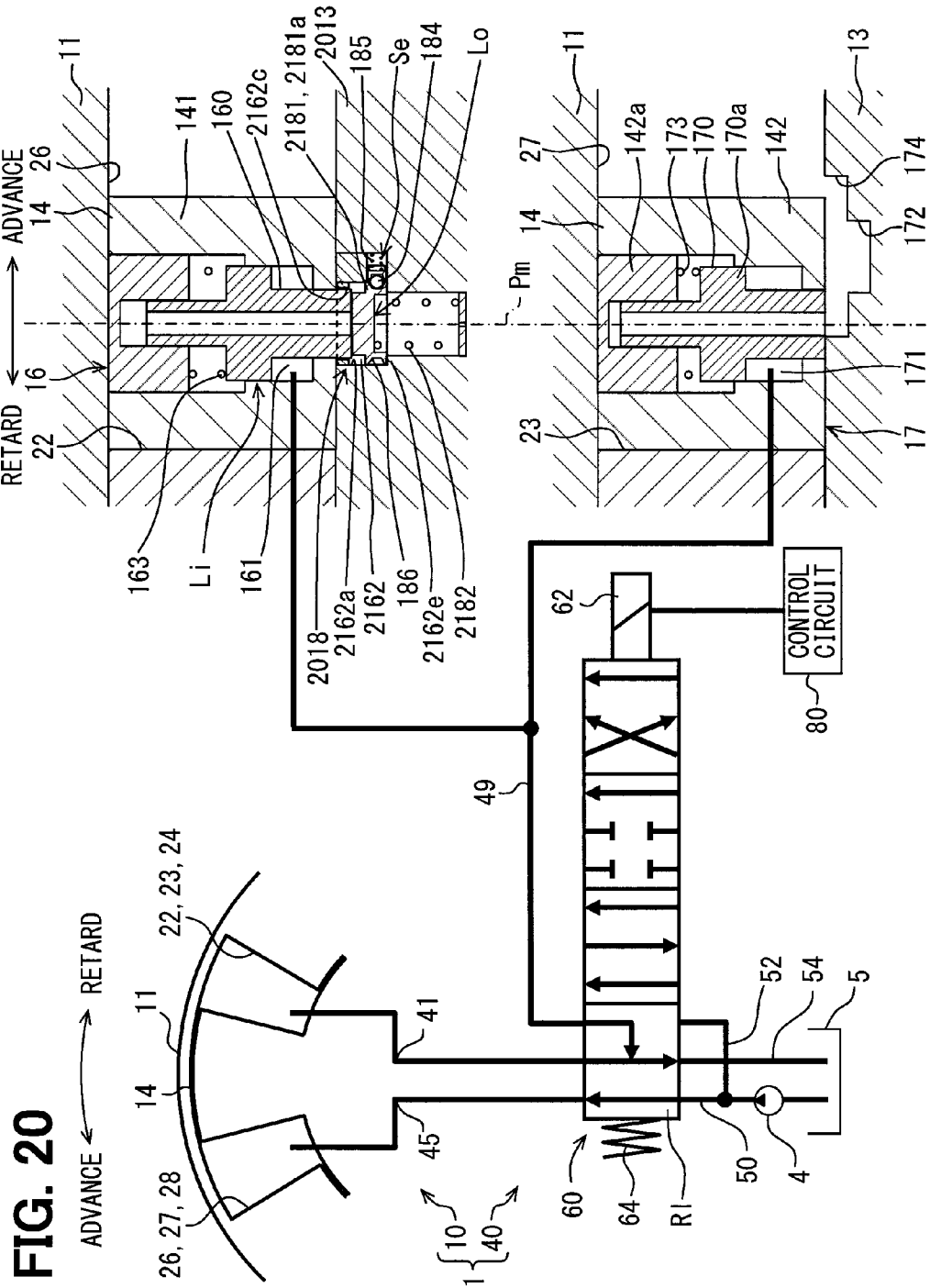
FIG. 20 is a schematic view to show an action state of the valve timing adjusting device of FIG. 19.
Figure 23:
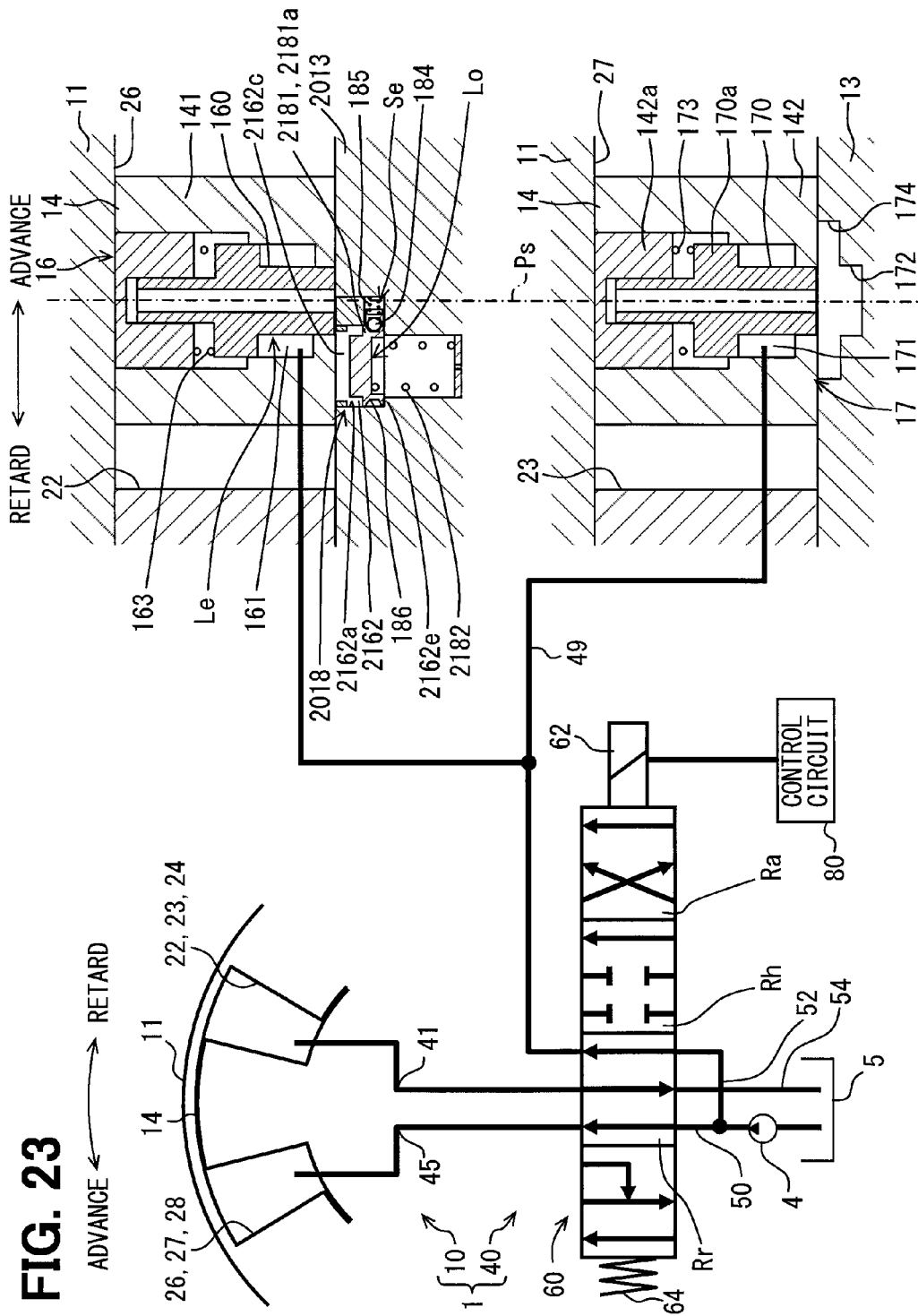
FIG. 23 is a schematic view to show still another action state different from FIGS. 20 to 22 of the valve timing adjusting device of FIG. 19.

On the other hand, as shown in FIGS. 19, 20, 23, when the moving member 2181 moves to the opening position Lo which is more separated from the vane rotor 14 than the closing position Lc, the moving member 2181 opens the opening part 2162c. With the moving member 2181 opening the opening part 2162c in this way, at the main lock phase Pm shown in FIG. 20, the main lock member 160 is allowed to move to a fitting-in position Li and to be fitted in the main lock bore 2162. At this time, in the present embodiment, the large-diameter moving part 2181a is retained by a stopper part 2162e provided on a side opposite to the opening part 2162c in the large-diameter bore part 2162a.

As shown in FIG. 19, the control elastic member 2182 is a coil spring made of metal and is housed in a small-diameter bore part 2162b on a side opposite to the vane rotor 14 of the main lock bore 2162. The control elastic member 2182 is interposed in the axial direction between a retainer part 2130 provided in the rear plate 2013 and the large-diameter moving part 2181a arranged in the large-diameter bore part 2162a. The control elastic member 2182 in this interposed state generates the restoring force Fr in such a way as to bias the moving member 2181 to the vane rotor 14 side, that is, to the closing position Lc side shown in FIGS. 21, 22. Moreover, a force for driving the moving member 2181, which is produced by the pressure applied from the working oil in the advance chamber 22 or the retard chamber 26, against the restoring force Fr of the control elastic member 2182 is applied toward the opening position Lo shown in FIGS. 19, 20, 23.

Here, as shown in FIG. 19, the restoring force Fr of the control elastic member 2182 is applied along the axial direction of the moving member 2181 and hence becomes a biasing force in a direction crossing the latch inner face 186a. Further, the restoring force Fr of the control elastic member 2182 is previously set in such a way as to be not less in magnitude than the restoring force of the main elastic member 163 when the moving member 2181 in contact with the main lock member 160 moves between the positions Lo and Lc.

In the lock control mechanism 2018 of the second embodiment, a housing bore 141c for housing elements 183, 184, 185 is formed in the rear plate 2013 according to the first embodiment. In this construction, the axial direction of the housing bore 141c substantially corresponds with the radial direction of the moving member 2181. Hence, as shown in FIGS. 19, 20, 23, the latch member 184 in the housing bore 141c is moved also into the latch opening part 186 of the moving member 2181 at the opening position Lo, thereby retaining the opening part 186 to thereby latch the moving member 2181. On the other hand, as shown in FIGS. 21, 22, the latch member 184 is pushed to the outside of the latch opening part 186 from the outer circumferential face of the large-diameter moving part 2181a of the moving member 2181 moved to the closing position Lc side, thereby being released from the opening part 186 to thereby unlatch the moving member 2181. Furthermore, the preset temperature Ts of the temperature sensing body 185 is previously set in such a way that the restoring force Ft shown in FIG. 19, which is applied to the latch member 184 when the temperature of the temperature sensing body 185 becomes the preset temperature Ts, substantially corresponds with the component of force Frd (not shown in the drawing) of the restoring force Fr received by the latch member 184 in the axial direction (that is, radial direction of the moving member 2181) from the latch inner face 186a in the state where the latch member 184 is pressed by the restoring force Ft onto the latch inner face 186a in the moving member 2181 at the opening position Lo.

In the lock control mechanism 2018 described above, as is the case of the first embodiment, when the engine temperature T becomes not less than the preset temperature Ts, the restoring force Ft is increased to a value not less than the preset value Fts and becomes more than the component of force Frd of the restoring force Fr. As a result, the temperature sensing body 185 is changed to the expanded state shown in FIGS. 19, 20, 23 to thereby press the latch member 184 into the latch opening part 186, whereby the moving member 2181 is latched at the opening position Lo. Further, when the moving member 2181 is latched at the opening position Lo, the main lock bore 2162 is opened, so that at the main lock phase Pm shown in FIG. 20, the main lock member 160 can be guided to the fitting-in position Li. With the main lock member 160 being guided to the fitting-in position Li in this manner, the main lock member 160 is allowed to be fitted in the main lock bore 2162, that is, the rotation phase is allowed to be locked.

On the other hand, as is the case of the first embodiment, when the engine temperature T becomes less than the preset temperature Ts, the component of force Frd of the restoring force Fr becomes larger than the restoring force Ft which is decreased to a value less than the preset value Fts. As a result, the moving member 2181 presses the latch member 184 and moves to the closing position Lc. At this time, as shown in FIGS. 21, 22, while the latch member 184 presses the temperature sensing body 185 to thereby change the temperature sensing body 185 to the contracted state Sc, the latch member 184 itself is released to the outside of the latch member 184. Hence, the latch member 184 inhibited from being latched by the latch opening part 186 in this way brings the moving member 2181 into the state where the moving member 2181 is unlatched. Further, when the unlatched moving member 2181 reaches the closing position Lc, the main lock bore 2162 is closed and hence at the main lock phase Pm shown in FIG. 21, the main lock member 160 can be guided to the release position Le. With the main lock member 160 being guided to the release position Le, the main lock member 160 is released from being fitted in the main lock bore 2162, that is, the rotation phase is released from being locked.

(Action)

In the second embodiment described up to this, actions which are partially different from the first embodiment are realized in the normal operation, stop and starting. Hence, hereinafter, actions relating to the normal operation, stop, and starting, which are specific to the second embodiment, will be described in detail.

Figure 24:
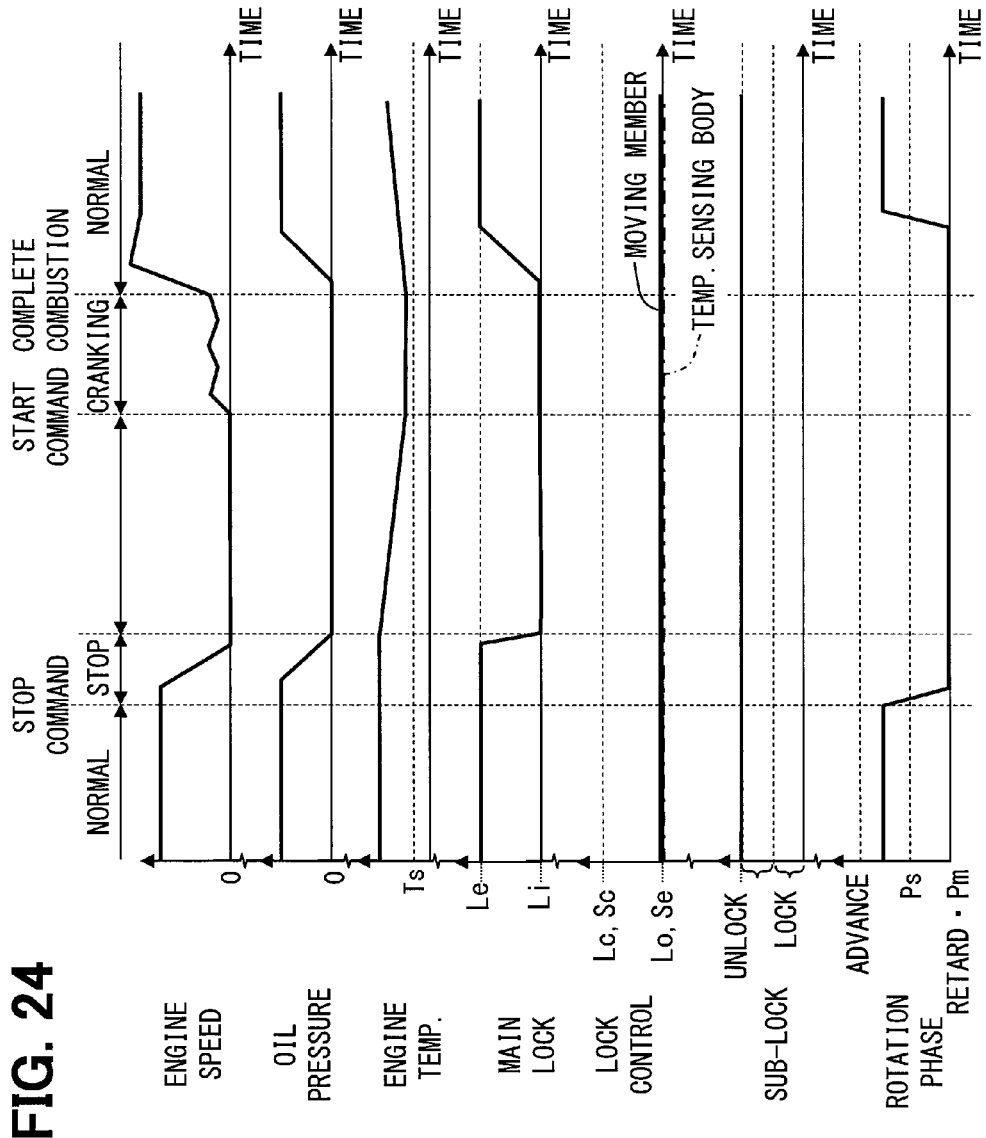
FIG. 24 is a graph to show an action example of the valve timing adjusting device of FIG. 19.
Figure 25:
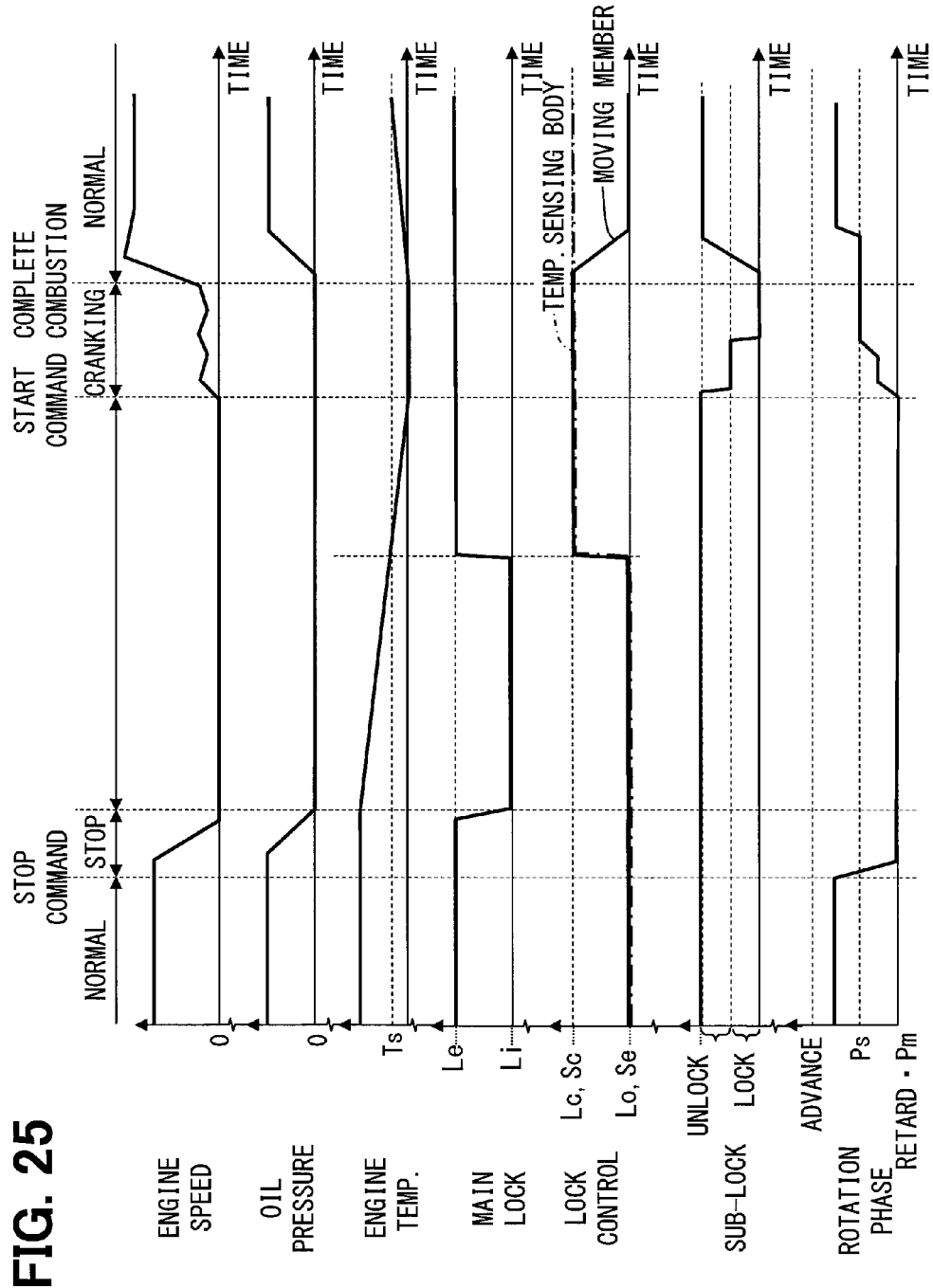
FIG. 25 is a graph to show another action example different from FIG. 24 of the valve timing adjusting device of FIG. 19.

First, during the normal operation of the internal combustion engine shown in FIGS. 24, 25, the state where the main lock member 160 is released from being unlocked at the main lock phase Pm is held by the pressure of the working oil applied to the main lock member 160 from the main lock chamber 161 regardless of the movement position of the moving member 2181. However, in this state, the moving member 2181 receives high pressure from the working oil in the advance chamber 22 or the retard chamber 26 during the normal operation, thereby being positioned at the opening position Lo against the restoring force Fr generated by the control elastic member 2182 (FIG. 23). Hence, when the engine temperature T becomes not less than the preset temperature Ts during the normal operation, the moving member 2181 is latched at the opening position Lo. The other actions during the normal operation are the same as in the first embodiment.

Next, when the internal combustion engine is stopped as shown in FIGS. 24, 25, the rotation phase is changed to the main lock phase Pm by the same principle as in the first embodiment and then the internal combustion engine is brought into the stop state. During the stop state, in the warm stop state in which the engine temperature T becomes not less than the preset temperature Ts as shown in FIG. 24, the restoring force Fr becomes not less than the preset value Fts and hence the temperature sensing body 185 is changed to the expanded state Se, whereby the moving member 2181 is held latched at the opening position Lo. As a result, the main lock member 160 is moved to the fitting-in position Li of the main lock bore 2162 (FIG. 20), whereby the rotation phase is locked at the main lock phase Pm. Thereafter, at the time of warm starting in which the engine temperature T becomes not less than the preset temperature Ts as shown in FIG. 24, except for the state where the moving member 2181 is held latched at the opening position Lo, by the same principle as in the first embodiment, the internal combustion engine is completely combusted in the state where the rotation phase is held locked at the main lock phase Pm.

In contrast to this, in the cold stop state caused after the engine temperature T becomes less than the preset temperature Ts as shown in FIG. 25 while the internal combustion engine is stopped, the restoring force Ft becomes less than the preset value Fts and hence the temperature sensing body 185 is changed to the contracted state Sc according to the movement to the closing position Le of the moving member 2181, whereby the moving member 2181 is unlatched. As a result, the main lock member 160 is moved to the release position Le in which the main lock member 160 is released from the main lock bore 2162 (FIG. 21), whereby the rotation phase is released from being locked at the main lock phase Pm. Thereafter, at the time of cold starting in which the engine temperature T becomes less than the preset temperature Ts as shown in FIG. 25, except for the state where the moving member 2181 is held moved to the closing position Lc, by the same principle as in the first embodiment, the internal combustion engine is completely combusted in the state where the rotation phase is changed to the subordinate phase Ps and then is locked (FIG. 22).

(Operation and Effect)

In the second embodiment described above can be produced the operations and effects described in the first embodiment in which the terms of "moving member 181", "first position L1", "second position L2", and "main lock bore 162" are replaced with "moving member 2181, "opening position Lo", "closing position Le", and "main lock bore 2162", respectively.

Third Embodiment

Figure 26:
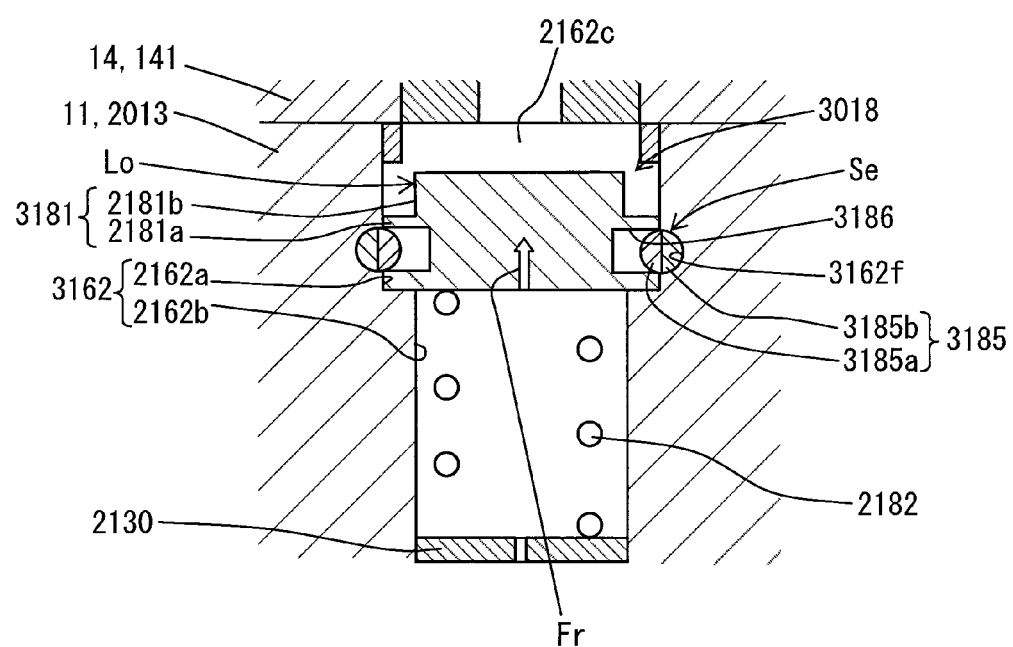
FIG. 26 is a section view, on an enlarged scale, to show a main part of a valve timing adjusting device according to a third embodiment of the present invention.

As shown in FIG. 26, a third embodiment of the present invention is a modified example of the second embodiment.

(Lock Control Mechanism)

In a lock control mechanism 3018 assembled as "the lock control portion" on a main lock bore 2162 side of the main lock mechanism 16, the elements 183, 184, 185 are not provided and a temperature sensing body 3185, which is different from the temperature sensing body 3185 in the second embodiment, functions also as "a latch member".

Specifically, the temperature sensing body 3185 is constructed of a bimetal formed in the shape of a partial ring. The temperature sensing body 3185 is housed in the main lock bore 3162 and surrounds the outer circumferential side of a moving member 3181 in the shape of a letter C. Here, in the present embodiment, a large-diameter bore part 2162*a* of the main lock bore 3162 has a latch groove part 3162*f* formed in an inner circumferential face thereof, the latch groove part 3162*f* being opened in the shape of a ring groove continuously formed in a circumferential direction. Further, a large-diameter moving part 2181*a* of the moving member 3181 has a latch opening part 3186 formed in an outer circumferential face thereof, the latch opening part 3186 being opened in the shape of a ring groove having a square cross section and continuously formed in the circumferential direction.

Figure 27:
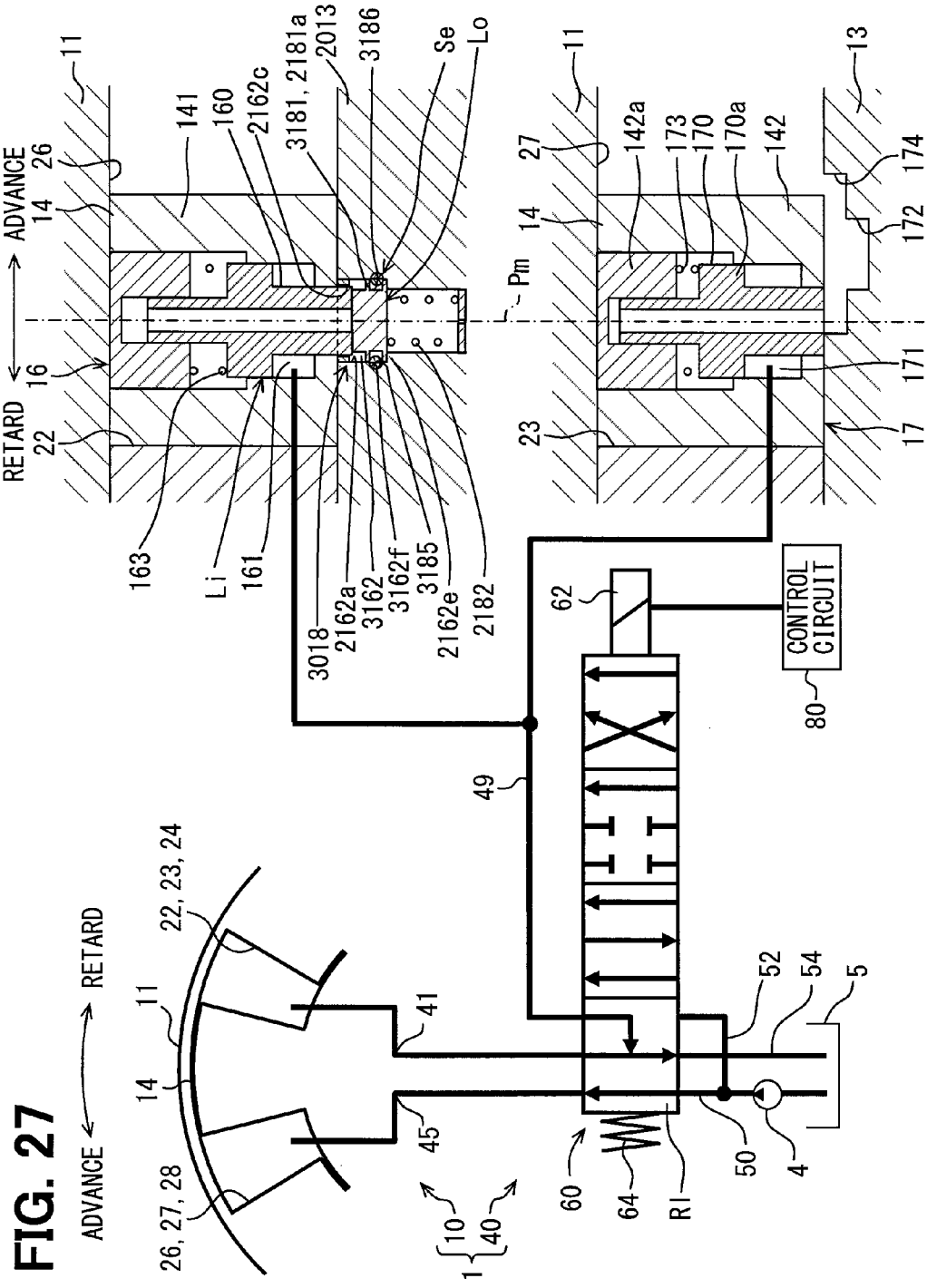
FIG. 27 is a schematic view to show an action state of the valve timing adjusting device of FIG. 26.
Figure 28:
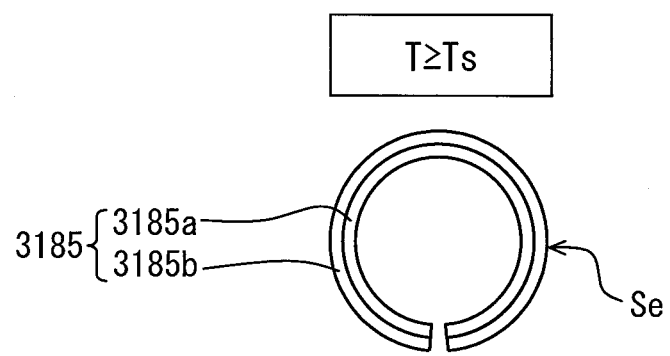
FIG. 28 is a plan view to show a temperature sensing body in the action state of FIG. 26.
Figure 30:
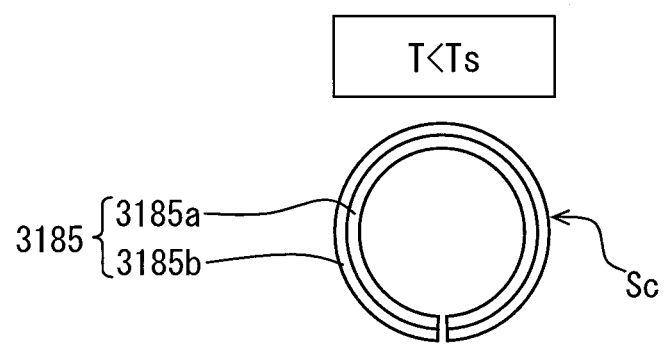
FIG. 30 is a plan view to show a temperature sensing body in the action state of FIG. 29.

As shown in FIGS. 26, 28, 30, the temperature sensing body 3185 includes a high expansion layer 3185*a* and a low expansion layer 3185*b* which are different from each other in the coefficient of linear thermal expansion. Here, the low expansion layer 3185*b* is lower in the coefficient of linear thermal expansion than the high expansion layer 3185*a* and is stacked on the outer circumferential side of the high expansion layer 3185*a*. Since the temperature sensing body 3185 is formed in this stacked structure, the temperature sensing body 3185 is changed to an expanded state Se expanded as shown in FIGS. 26, 27, 28 at the engine temperature T not less than the preset temperature Ts, thereby being expanded in diameter. Hence, in the state where the moving member 3181 is moved to the opening position Lo, as shown in FIGS. 26, 27, the temperature sensing body 3185 is fitted in the latch groove part 3162*f* and in a latch opening part 3186. As a result, the temperature sensing body 3185 latched by the latch groove part 3162*f* further retains the latch opening part 3186, whereby the moving member 3181 is latched at the opening position Lo. Furthermore, when the moving member 3181 is latched at the opening position Lo, the main lock bore 3162 is opened and hence at the main rotation phase Pm shown in FIG. 27, the main lock member 160 can be guided to the fitting-in position Li. With the main lock member 160 being guided to the fitting-in position Li in this manner, the main lock member 160 is allowed to be fitted in the main lock bore 3162, that is, the rotation phase is allowed to be locked.

Figure 29:
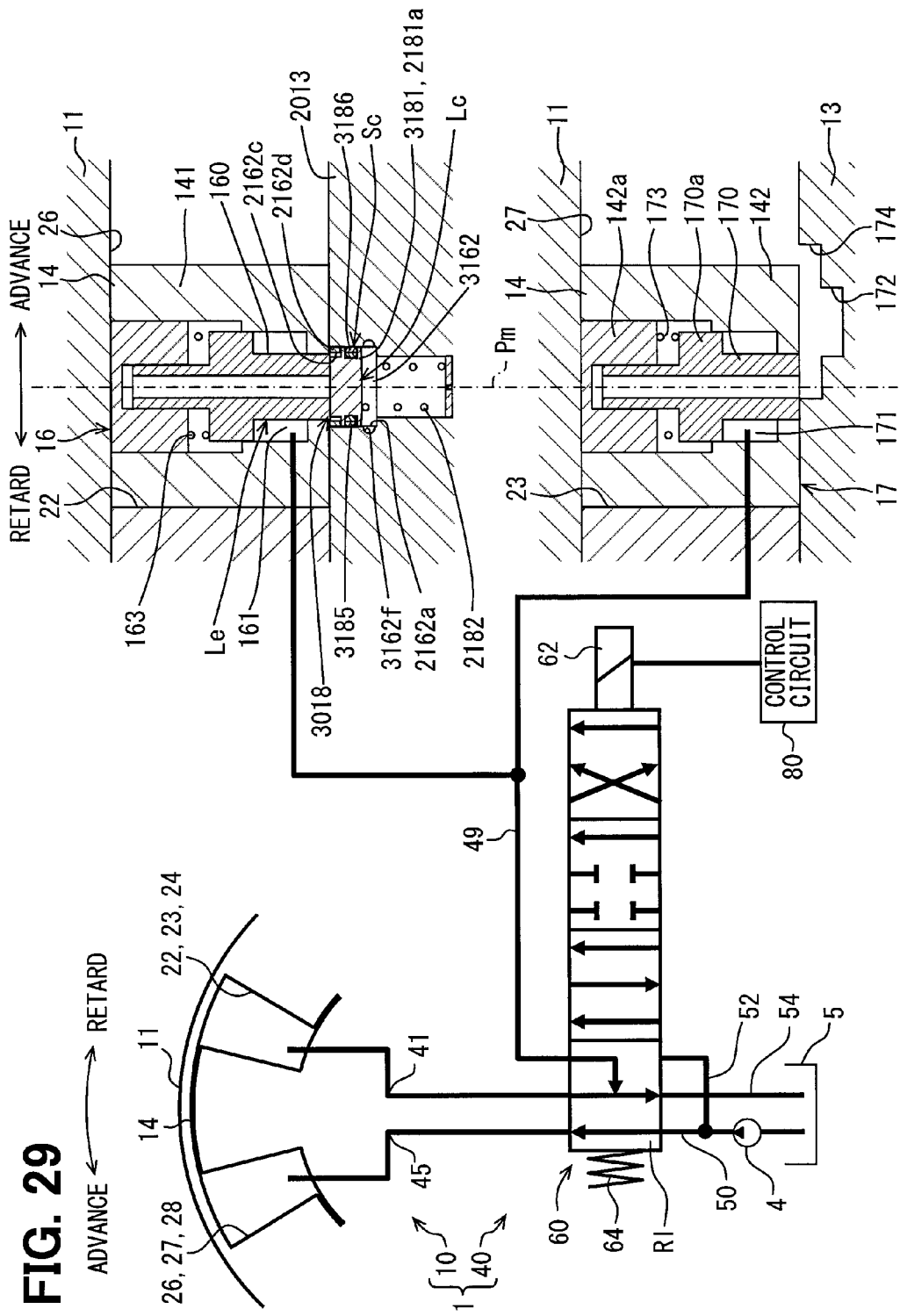
FIG. 29 is a schematic view to show another action example different from FIG. 27 of the valve timing adjusting device of FIG. 26.

On the other hand, the temperature sensing body 3185 is changed to a contracted state Sc as shown in FIGS. 29, 30 at the engine temperature T less than the preset temperature Ts, thereby being contracted in diameter. Hence, the temperature sensing 3185 is detached to the outside of the latch groove part 3162*f* as shown in FIG. 29 from the state where the moving member 3181 is moved to the opening position Lo, thereby being housed in the latch opening part 3186. In this way, the temperature sensing body 3185 inhibited from being latched by the latch opening part 3186 is brought into the state where the temperature sensing body 3185 is unlatched from the moving member 3181, so that the moving member 3181 receiving the restoring force Fr from the control elastic member 2182 (see FIG. 26) is moved to the closing position Lc as shown in FIG. 29. Further, when the moving member 3181 reaches the closing position Lc, the main lock bore 3162 is closed, the main lock member 160 can be guided to the release position Le at the main lock phase Pm shown in FIG. 29. With the main lock member 160 being guided to the release position Le in this manner, the main lock member 160 can be released from being fitted in the main lock bore 3162, that is, the rotation phase is released from being locked.

(Action)

In the third embodiment having the construction described up to this point are realized the actions described in the second embodiment in which the terms of "temperature sensing body 185", "moving member 2181", and "main lock bore 2162" are replaced with "temperature sensing body 2185", "moving member 3181", and "main lock bore 3162", respectively.

(Operation and Effect)

Operations and effects specific to the third embodiment described above will be described.

According to the third embodiment, at the main lock phase Pm in the warm stop state, the temperature sensing body 3185 made of bimetal is changed to the expanded state Se according to a temperature increase and hence retains the latch opening part 3186. As a result, the moving member 3181 is latched at the opening position Lo at which the rotation phase is allowed to be locked at the main lock phase Pm. On the other hand, at the main lock phase Pm in the cold stop state, the temperature sensing body 3185 is changed to the contracted state Sc according to a temperature decrease, thereby being housed in the latch opening part 3186. As a result, the latch opening part 3186 is inhibited from latching the moving member 3181 and hence the unlatched moving member 3181 is moved to the closing position Lc at which the rotation phase is released from being locked at the main lock phase Pm. According to the operation described above, accuracy in the switching of the rotation phase to a rotation phase suitable for the time of warm starting after the warm stop and for the time of cold starting after the cold stop can be enhanced.

Fourth Embodiment

Figure 31:
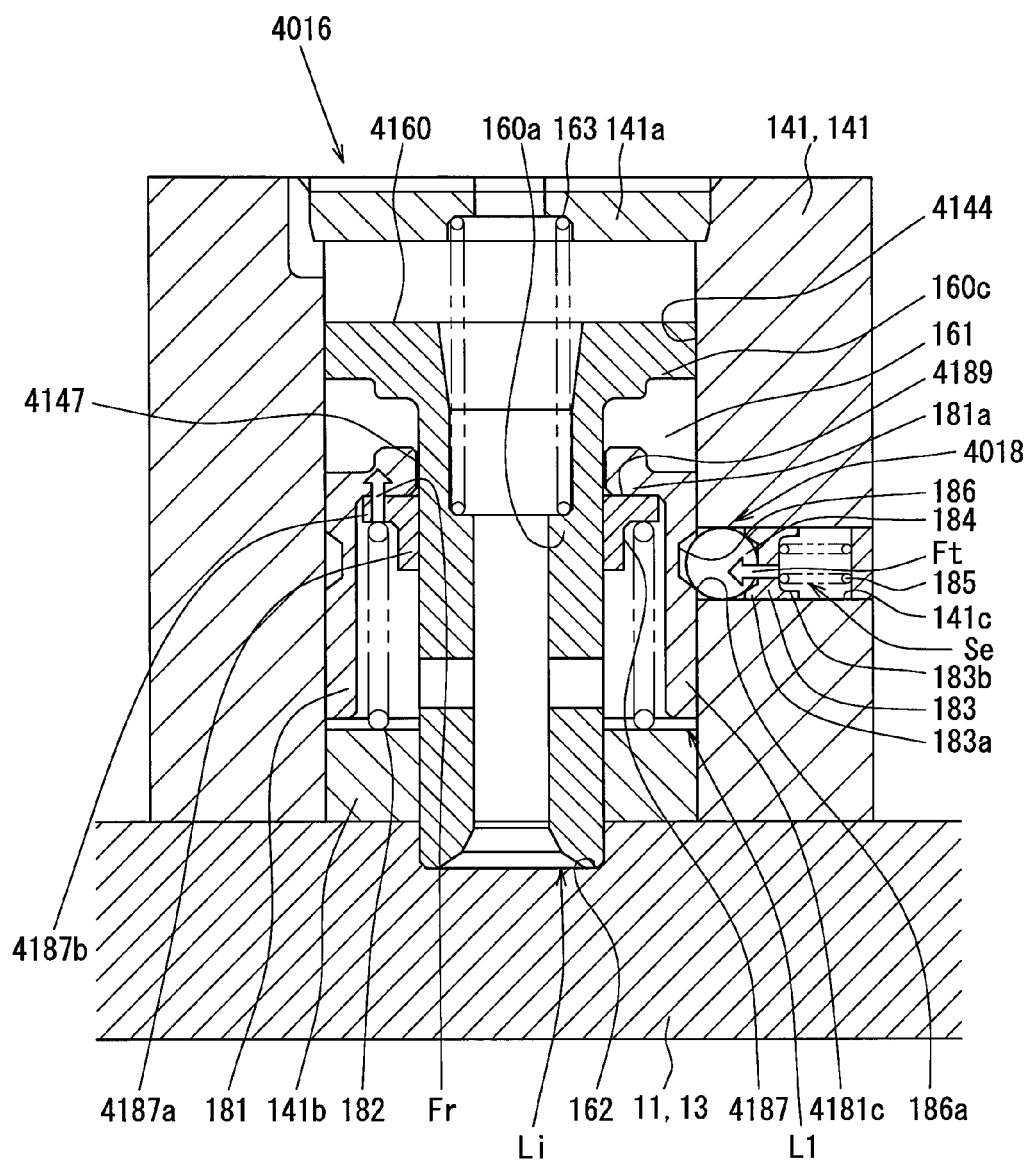
FIG. 31 is a section view, on an enlarged scale, to show a main part of a valve timing adjusting device according to a fourth embodiment of the present invention.
Figure 32:
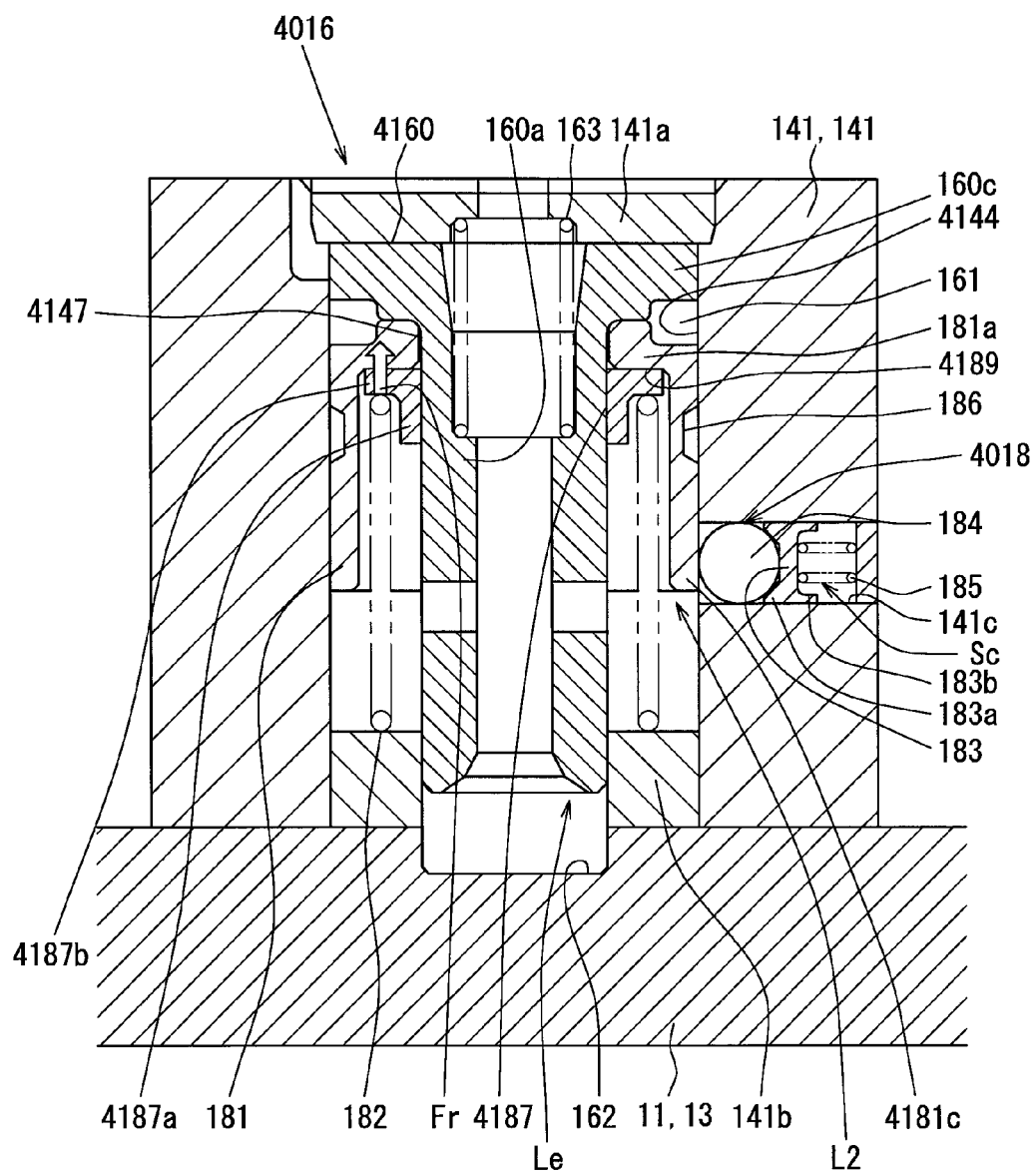
FIG. 32 is a schematic view to show an action example different from FIG. 31 of the valve timing adjusting device of FIG. 31.
Figure 33:
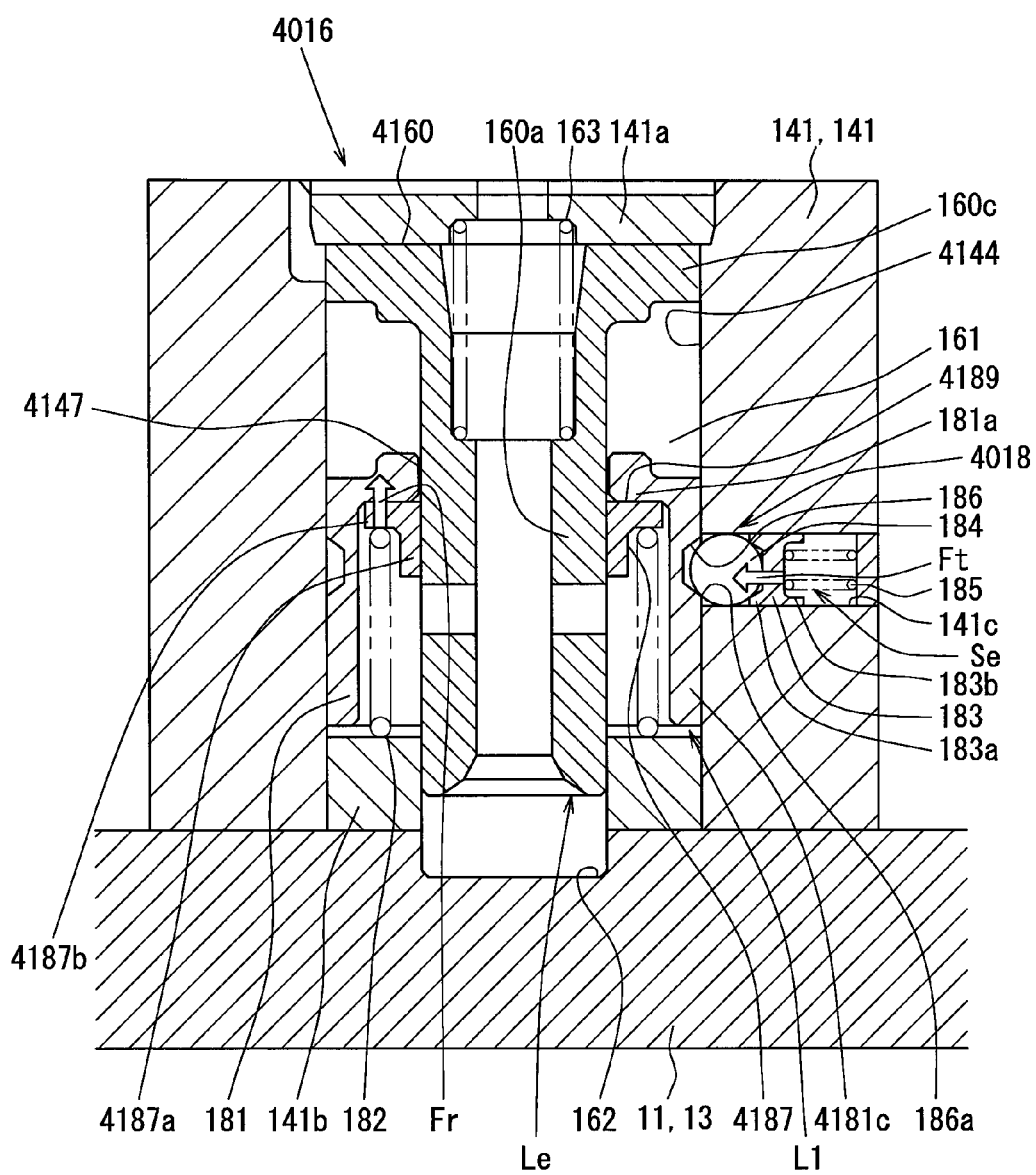
FIG. 33 is a schematic view to show another action example different from FIGS. 31, 32 of the valve timing adjusting device of FIG. 31.

As shown in FIGS. 31 to 33, a fourth embodiment of the present invention is a modified example of the first embodiment.

(Main Lock Mechanism)

Figure 34:
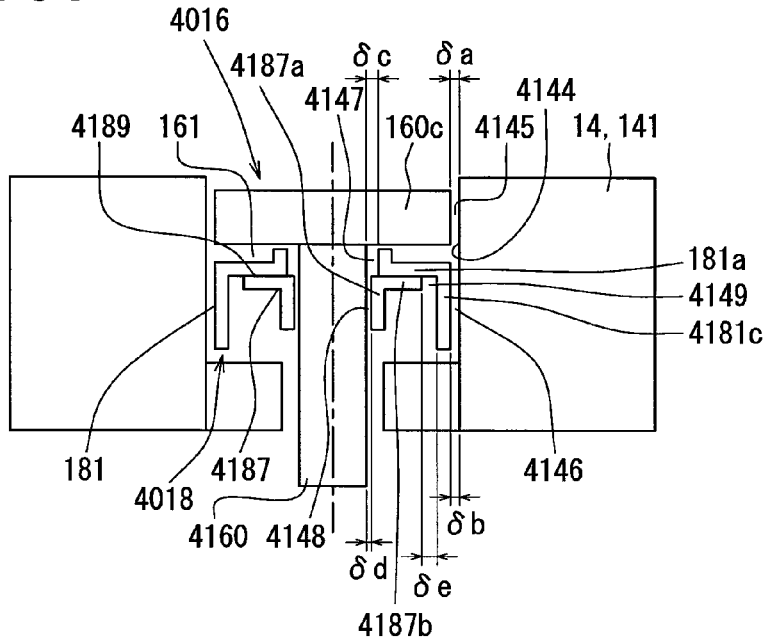
FIG. 34 is a schematic view to show a state of the valve timing adjusting device of FIG. 31.
Figure 35:
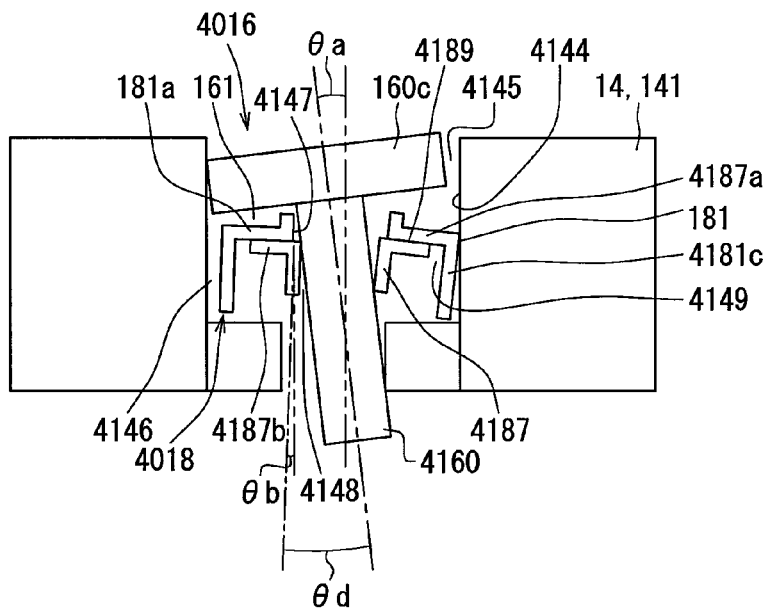
FIG. 35 is a schematic view to show another state different from FIG. 34 of the valve timing adjusting device of FIG. 31.
Figure 36:
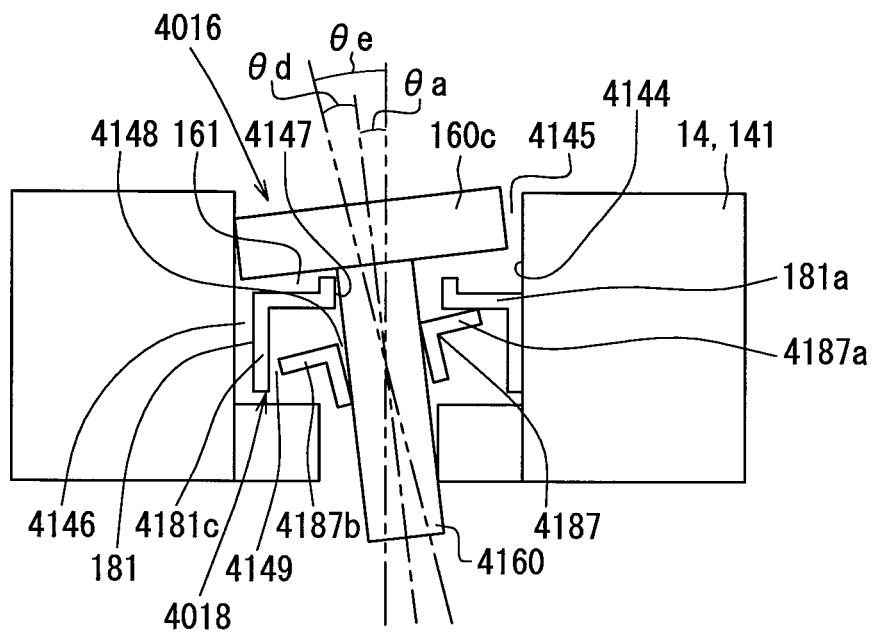
FIG. 36 is a schematic view to show still another state different from FIGS. 34, 35 of the valve timing adjusting device of FIG. 31.

In a main lock mechanism 4016 as "the main lock portion", the vane 141 at a portion eccentric with respect to the rotary shaft 140 of the vane 14 has a support bore 4144 formed therein, the support bore 4144 being formed in the shape of a circular cylindrical bore. As shown in FIG. 34, the support bore 4144 has a collar part 160*c* of a main lock member 4160 coaxially fitted therein via a radial clearance 4145 having a specified size δa. With the collar part 160*c* being fitted in the support bore 4144, the circular cylindrical main lock member 4160 is supported slidably by the support bore 4144 and hence can be reciprocated between the fitting-in position Li and the release position Le in the axial direction (see FIGS. 31 to 33). Further, in the support bore 4144, the main lock member 4160, as shown in FIGS. 35, 36, can be slanted to an angle θa according to the size δa of the radial clearance 4145. That is, a maximum slant of the main lock member 4160 is adjusted in such a way as to be the angle θa. In this regard, the main lock member 160 of the present embodiment is not provided with the retaining part 160*b*.

(Lock Control Mechanism)

A lock control mechanism 4018 assembled as "the lock control portion" on a main lock member 4160 side as shown in FIGS. 31 to 33 includes the moving member 181, a ring member 4187, the control elastic member 182, the retainer member 183, the latch member 184, and the temperature sensing body 185.

The moving member 181 is formed in the shape of a circular cylinder having a closed bottom, the circular cylinder having a bottom end part 181*a* protruded inward in the shape of a flange from a cylinder part 4181*c*. As shown in FIG. 34, the cylinder part 4181*c* of the moving member 181 is coaxially fitted in the support bore 4144 via a radial clearance 4146 having a specified size δb. The bottom end part 181*a* of the moving member 181 is coaxially fitted on the outside of the main lock member 4160 via a radial clearance 4147 having a specified size δc. With the moving member 181 fitted in the support bore 4144 and fitted on the outside of the main lock member 4160, the moving member 181 is slidably supported by the support bore 4144 and hence can be reciprocated between the first position L1 and the second position L2 in the axial direction (FIGS. 31 to 33). Furthermore, as shown in FIG. 35, in the support bore 4144, the moving member 181 can be slanted to an angle θb according to the size δb of the radial clearance 4146. That is, a maximum slant of the moving member 181 is adjusted in such a way as to be slanted by the angle θb.

Here, at the main lock phase Pm, the moving member 181 is latched at the first position L1 as shown in FIG. 31, thereby positioning the main lock member 160 at the fitting-in position Li in which the main lock member 160 is fitted in the main lock bore 162 in the state where the collar part 160c of the main lock member 160 is separated from the bottom end part 181a. On the other hand, at the main lock phase Pm and the other rotation phase, the moving member 181 is latched at the first position L1 as shown in FIG. 33, thereby allowing the main lock member 160 to move to the release position Le in which the collar part 160c is further separated from the bottom end part 181a. Further, at the main lock phase Pm and the other rotation phase, the moving member 181 is moved to the second position L2 as shown in FIG. 32, thereby retaining the collar part 160c by the bottom end part 181a, whereby the main lock member 160 is positioned at the release position Le in which the main lock member 160 is released from the main lock bore 162.

The main lock member 4160 can be slanted to the angle θa with respect to the moving member 181 without being substantially put into contact with the bottom end part 181a by the radial clearance 4147 as shown in FIGS. 35, 36. In other words, the size δc of the radial clearance 4147 as "an allowance clearance" is adjusted to a size to allow the maximum slant of the angle θa of the main lock member 4160 in the support bore 4144. With the size δc of the radial clearance 4147 being adjusted in the manner, the radial clearance 4147 is formed in the size δc larger than the size δa of the clearance 4145 and the size δb of the clearance 4146, thereby allowing the working oil to flow into the radial clearance 4147 from the main lock release chamber 161 around the main lock member 4160.

As shown in FIGS. 31 to 33, the ring member 4187 made of metal is formed in the shape of a hat-shaped circular cylinder having a collar part 4187a protruded outward in the shape of a flange from a cylinder part 4187a and is coaxially inserted into the support bore 4144 with a play. As shown in FIG. 34, the cylinder part 4187a of the ring member 4187 is coaxially fitted on the outside of the main lock member 4160 via a radial clearance 4148 having a specified size of δd. The collar part 4187b of the ring member 4187 is inserted coaxially into the cylinder part 4181c on the inner circumferential side via a radial clearance having a specified size of δe. With the ring member 4187 being fitted on the outside of the main lock member 4160 and inserted into the cylinder part 4181c with a play in this manner, the ring member 4187 is slidably supported by the main lock member 4160 and hence can be reciprocated in the axial direction on the inner circumferential side of the moving member 181 in the support bore 4144.

Figure 37:
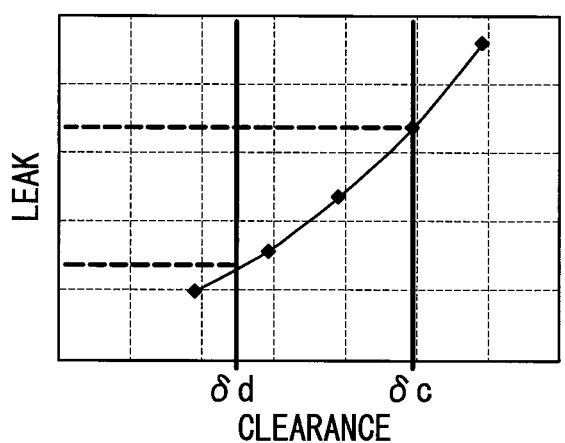
FIG. 37 is a graph to show a relationship between a clearance size and the amount of leak of a working oil of FIG. 34.

The clearance 4148 between the elements 4187, 160 in this lock control mechanism 4018 is positioned as "a sealing clearance" on a side opposite to the main lock release chamber 161 with the clearance 4147 interposed in the axial direction. Furthermore, as shown in FIGS. 34, 37, the clearance 4148 is formed in a size δd smaller than the size δc of the clearance 4147. Here, particularly in the present embodiment, the size δd is adjusted within a range smaller than the size δc in such a way that, as shown in FIG. 35, the moving member 181 can be slanted to the maximum angle to a side opposite to the main lock member 4160 slanted to the maximum angle with the collar part 4187b held in face contact with the bottom end part 181a. In other words, the size δd is adjusted within the range smaller than the size δc in such a way that a relative slant angle δd of the ring member 4187 to the main lock member 4160 becomes not less than the sum of the angles θa and θb. With the size δd being adjusted in this manner, the clearance 4148 inhibits the working oil from passing through the clearance 4147 (that is, leakage in the size δd shown in FIG. 37) in cooperation with an interface 4189 of face contact between the elements 181a and 4187b, thereby fulfilling a sealing function to the working oil in the main lock release chamber 161 and in the clearance 4147.

Further, as shown in FIG. 34, in the lock control mechanism 4018, a clearance 4149 between the elements 4187 and 181 is formed as "a clearance with a play" in a size δe larger than any one of the sizes δa, δb, δc, δd of the clearances 4145, 4146, 4147, 4148. Here, particularly in the present embodiment, the size δe is adjusted in such a way that even if a relative slant of the ring member 4187 to the main lock member 4160 slanted to the maximum angle becomes a maximum angle as shown in FIG. 36, the collar part 4187b is not substantially put into contact with the cylinder part 4181c by the clearance 4149. In other words, the size δe is adjusted in such a way that the maximum slant angle θe of the ring member 4187 corresponds with the sum of the angles θa and θd in the support bore 4144. With the size δe being adjusted in this manner, the clearance 4149 allows the ring member 4187 to be slated to the maximum angle in the support bore 4144 in the state where the main lock member 4160 is slanted to the maximum angle in the support bore 4144.

The control elastic member 182 of the coil spring as shown in FIGS. 31 to 33 is sandwiched in the axial direction between the collar part 4187b and the spring receiving part 141b. In addition, the control elastic member 182 is guided in the axial direction from the inner circumferential side by the cylinder part 4187a as "a guide part". The control elastic member 182 sandwiched and guided in this manner generates the restoring force Fr in such a way as to bias the collar part 4187b to *a* bottom end part 181a side. The ring member 4187 receiving the restoring force Fr is put into contact with the moving member 181 from the first position L1 side, thereby pressing the moving member 181 toward the second position L2 side. Here, particularly in the present embodiment, the collar part 4187b of the ring member 4187 is put into face contact with the moving member 181 to be pressed in the whole area in the circumferential direction thereof. With the collar part 4187b being put into face contact with the moving member 181 in this manner, the ring member 4187 fulfills a sealing function to the working oil in the main lock release chamber 161 and in the clearance 4147 by the interface 4189 described above. Further, the moving member 181 is biased to the second position L2 side by the restoring force Fr via the ring member 4187 which is put in the face contact with the moving member 181 and hence can be moved in a direction to release the main lock member 4160 from being fitted in the main lock bore 162.

In this regard, in the lock control mechanism 4018, the construction relating to the elements 183, 184, 185 is substantially same as the first embodiment as shown in FIGS. 31 to 33.

(Action, Operation, and Effect)

The fourth embodiment of the construction described above can realize the same actions as the first embodiment to thereby produce the same operations and effects as the first embodiment.

Furthermore, in the fourth embodiment, during the normal operation after the starting of the internal combustion engine, as is the case of the first embodiment, the moving member 181 receiving the pressure applied by the working oil introduced into the main lock release chamber 161 is moved to the first position L1 and the main lock member 4160 receives the pressure, thereby being moved to the release position Le (see FIG. 33). As a result, the main lock member 4160 is released from being fitted in the main lock bore 162, that is, the rotation phase is released from being locked, so that a free valve timing adjustment according to the rotation phase can be made. At this time, when the engine temperature T becomes not less than the preset temperature Ts by the normal operation, as is the case of the first embodiment, the moving member 181 is latched at the first position L1. Hence, when the internal combustion engine is stopped in this latched state, the pressure of the working oil introduced into the main lock release chamber 161 is vanished and hence the main lock member 4160 is biased by the main elastic member 163 and is moved to the fitting-in position Li, whereby the rotation phase is locked at the main lock phase Pm. Further, thereafter, when the engine temperature T becomes less than the preset temperature Ts, the rotation phase is released from being locked at each of the lock phases Pm, Ps.

Here, in the fourth embodiment, when the main lock member 4160 having the moving member 181 coaxially fitted on the outside thereof is slanted with respect to the moving member 181 slidably supported by the same support bore 4144 and is put into contact with the moving member 181, there is fear that the main lock member 4160 will be inhibited from reciprocating. Hence, in the fourth embodiment, the clearance 4147 formed between the moving member 181 and the main lock member 4160 is formed in the size δc that allows the main lock member 4160 to be slanted. In this case, however, the working oil is also allowed to flow into the clearance 4147 from the main lock release chamber 161. As a result, when the pressure of the working oil applied to the main lock member 4160 during the normal operation is decreased, there is fear that the main lock member 4160 will be accidentally fitted in the main lock bore 162 to cause the rotation phase to be unintentionally locked.

However, according to the fourth embodiment, on the side opposite to the main lock release chamber 161 across the clearance 4147 in the axial direction, the clearance 4148 having the size δd smaller than the clearance 4147 is formed between the main lock member 4160 and the ring member 4187 coaxially fitted on the outside of the main lock member 4160. According to this clearance 4148, a sealing function of inhibiting the working oil from passing through the clearance 4147 can be fulfilled. In addition, according to the fourth embodiment, so as to press the moving member 181 to the second position L2, the ring member 4187 receives the restoring force Fr from the control elastic member 182 and hence is put into contact with the moving member 181 from the first position L1 side. Hence, also at the contact interface 4189, the ring member 4187 can fulfill a sealing function of inhibiting the working oil from passing through the clearance 4147 in cooperation with the clearance 4148. Hence, even the clearance 4147 having the size δc, which allows the working oil to flow in from the main lock release chamber 161, can prevent a decrease in the pressure of the working oil applied to the main lock member 4160 during the normal operation by the sealing function, which hence makes it possible to avoid the rotation phase from being unintentionally locked.

Further, according to the fourth embodiment, the main lock member 4160, which is inserted into the support bore 4144 with a play and has the ring member 4187 fitted on the outside thereof, can be slanted together with the ring member 4187. Hence, the main lock member 4160 becomes hard to be inhibited from reciprocating. In addition, according to the fourth embodiment, even if the ring member 4187 receives a load from the moving main lock member 4160 and is slanted, after moving, the ring member 4187 is put into contact with the moving member 181 by the restoring force Fr of the control elastic member 182 and hence can secure the sealing function. Hence, the ring member 4187 can produce the effect of avoiding the rotation phase from being unintentionally locked as a firm effect.

In addition, the main lock member 4160 of the fourth embodiment can be allowed to be slanted to the maximum angle in the support bore 4144 by the clearance 4144 between itself and the moving member 181. According to this, it is possible to prevent a trouble such that the main lock member 4160 is put into contact with the moving member 181 and that is hence inhibited from reciprocating regardless of a slant angle of the main lock member 4160. Furthermore, in the fourth embodiment, in the support bore 4144 when the main lock member 4160 is brought into a maximum slanted state, the ring member 4187, which is inserted coaxially into the inner circumferential side of the moving member 181 with a play, can be allowed to be slanted also to the maximum angle by the clearance 4149 between itself and the moving member 181. According to this, regardless of the slant angle of the main lock member 4160, it is possible to prevent a trouble such that the ring member 4187 is sandwiched between the main lock member 4160 and the moving member 181 to thereby inhibit the main lock member 4160 from reciprocating.

Other Embodiments

The plurality of embodiments of the present invention have been described above. However, it should not be understood that the present invention is limited to these embodiments but the present invention can be applied to various embodiments and the combinations of them within a range not departing from the gist of the present invention.

Specifically, as a modified example 1 relating to the first to fourth embodiments, a main lock phase Pm on an advance side from the most retarded phase may be employed as far as the main lock phase Pm is a rotation phase in which the intake valve 9 is closed at a timing later than the timing when the piston 8 in the cylinder 7 reaches the bottom dead center BDC. Furthermore, as a modified example 2 relating to the first to fourth embodiments, the lock members 160, 4160, 170 are supported by the housing rotor 11, whereas the lock bores 162, 2162, 3162, 172 may be formed in the vane rotor 14. In this case, in the fourth embodiment, the support bore 4144 is formed in the housing rotor 11 in accordance with the lock members 4160, 170.

As a modified example 3 relating to the first to fourth embodiments, not only a spring made of metal of a kind other than the coil spring but also, for example, a member made of rubber may be employed as the elastic members 163, 173, 182, 2182. Furthermore, as a modified example 4 relating to the first to fourth embodiments, an electric pump, which can start to supply the working oil at the time when the internal combustion engine is completely combusted or an arbitrary time, may be employed as the pump 4.

As a modified example 5 relating to the first to fourth embodiments may be employed a construction in which the advance elastic member 19 is not provided. In this case, the order of the moving of the spool 68 to the lock region R1 and the performing of the inertial rotation of the internal combustion engine is reversed. Further, as a modified example 6 relating to the first, the second, and the fourth embodiments, a latch inner face 186*a* partially curved in a spherical shape may be employed as far as the latch inner face 186*a* crosses the direction of the restoring force Fr of the control elastic member 182. Still further, as a modified example 7 relating to the first to fourth embodiments, when the rotation phase is locked at the subordinate lock phase Ps when the internal combustion engine is stopped according to the off command of the engine switch SW or the idle stop command of the idle stop system ISS and then the internal combustion engine is started according to the on command of the engine switch SW or the restart command of the idle stop system ISS, the starting of the internal combustion engine may be realized as the rotation phase is held locked at the subordinate lock phase Ps.

As a modified example 8 relating to the first embodiment, a construction according to the lock control mechanism 3018 of the third embodiment may be employed on the main lock member 160 side. Further, as a modified example 9 relating to the first and second embodiments, the subordinate lock mechanism 17 is not provided with the elements 170, 171, 173 but the function of "the subordinate lock member" may be fulfilled by the main lock member 160.

Figure 38:
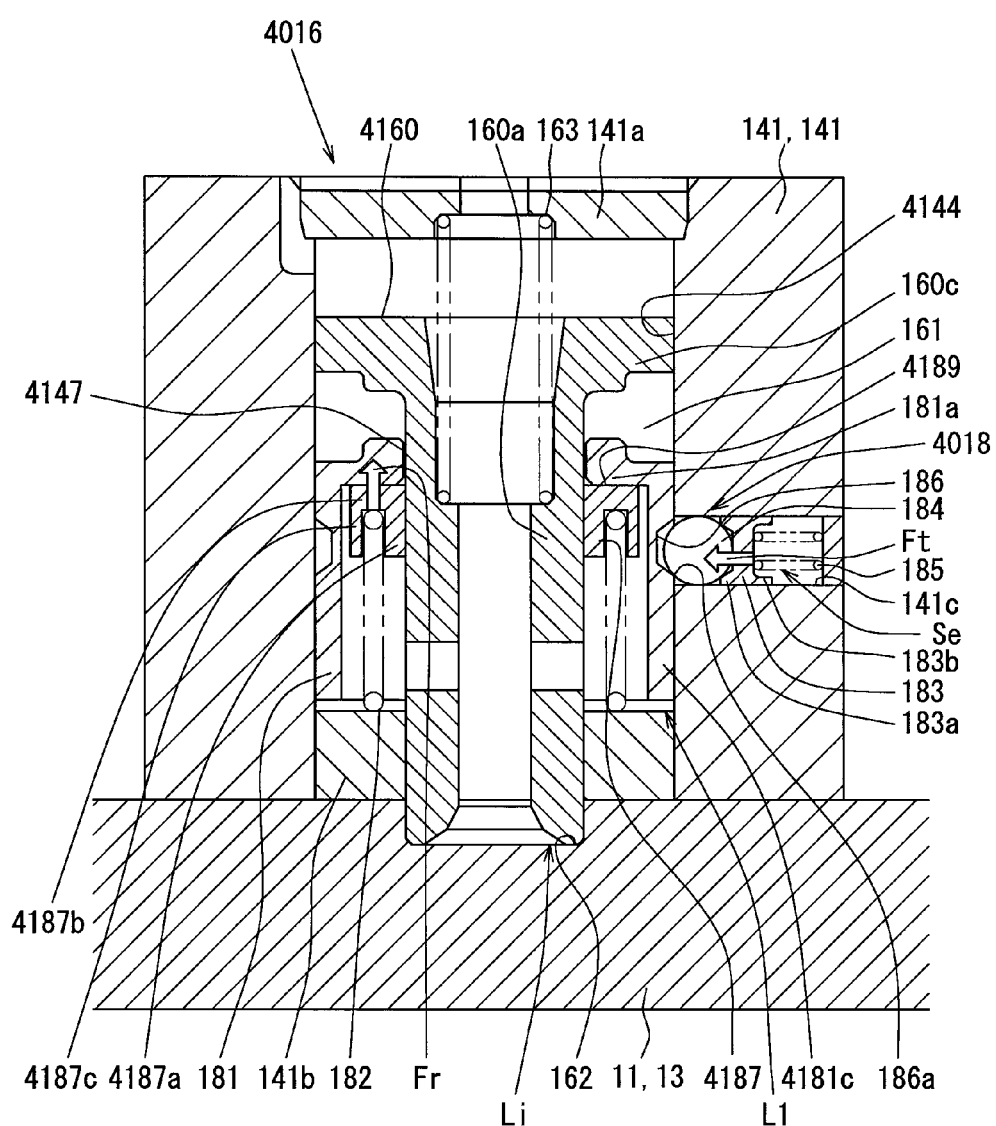
FIG. 38 is a section view to show a modified example of FIG. 31.

As a modified example 10 relating to the fourth embodiment, as shown in FIG. 38, a guide part 4187*c* for guiding the control elastic member 182 in the axial direction from the outer circumferential side may be provided for the ring member 4187. Further, as a modified example 11 relating to the fourth embodiment, a part of the slant of the main lock member 4160, for example, only a part of slant except for a maximum slant may be allowed by the clearance 4147 as "an allowance clearance". Still further, as a modified example 12 relating to the fourth embodiment, a part of the slant of the ring member 4187, for example, only a part of slant except for a maximum slant may be allowed by the clearance 4149 as "a play clearance".

What is claimed is:

1. A valve timing adjusting device for adjusting a valve timing of an intake valve for opening and closing a cylinder of an internal combustion engine by pressure of a working liquid, the valve timing adjusting device comprising:
    a housing rotor that rotates in conjunction with a crankshaft of the internal combustion engine;
    a vane rotor that rotates in conjunction with a camshaft of the internal combustion engine and receives pressure of the working liquid in the housing rotor, thereby having a rotation phase changed with respect to the housing rotor;
    a main lock portion that has a main lock member and a main lock bore, wherein at a main lock phase of the rotation phase for closing the intake valve at a timing later than a timing when a piston in the cylinder reaches a bottom dead center, the main lock member is fitted in the main lock bore to thereby lock the rotation phase;
    a subordinate lock portion that has a subordinate lock member and a subordinate lock bore, wherein at a subordinate lock phase of the rotation phase advancing further than the main lock phase, the subordinate lock member is fitted in the subordinate lock bore to thereby lock the rotation phase; and
    a lock control portion that has a temperature sensing body to be expanded and contracted and a moving member to be reciprocated between a first position and a second position each of which positions the main lock member, wherein at the main lock phase in a warm stop state during which temperature of the stopped internal combustion engine becomes not less than a preset temperature, the temperature sensing body is changed to an expanded state, whereby the moving member is latched at the first position in which the main lock member is allowed to be fitted in the main lock bore, and wherein at the main lock phase in a cold stop state caused after the temperature of the stopped internal combustion engine becomes less than the preset temperature, the temperature sensing body is changed to a contracted state, whereby the moving member is unlatched and hence the moving member is moved to the second position in which the main lock member is released from being fitted in the main lock bore.

2. The valve timing adjusting device according to claim 1, wherein the lock control portion has a latch member that retains a latch opening part formed in the moving part to thereby latch the moving member and that is inhibited from latching the latch opening part to thereby unlatch the moving member.

3. The valve timing adjusting device according to claim 2, wherein the lock control portion has a control elastic member for giving the moving member a restoring force for biasing the moving member in a direction to release the main lock member from being locked in the main lock bore,
    wherein the temperature sensing body made of a shape memory material is restored to the expanded state according to a temperature increase,
    wherein the latch opening part forms an inner face crossing a direction of the restoring force, and
    wherein when the latch member is pressed by the temperature sensing body in the expanded state, the latch member retains the latch opening part, whereas when the latch member receives a component of force of the restoring force from the inner face, the latch member presses the temperature sensing body to the contracted state and is released from the latch opening part.

4. The valve timing adjusting device according to claim 2, wherein the temperature sensing body made of bimetal is changed to the expanded state according to a temperature increase, thereby acting as the latch member and retaining the latch opening part, whereas the temperature sensing body is changed to the contracted state according to a temperature decrease, thereby being housed in the latch opening part as the latch member.

5. The valve timing adjusting device according to claim 1, wherein the main lock member is reciprocated in an axial direction between a fitting-in position in which the main lock member is fitted in the main lock bore and a release position in which the main lock member is released from being locked in the main lock bore,
    wherein the moving member is coaxially fitted on an outside of the main lock member via an allowance clearance of a specified size and is reciprocated between the first position and the second position in the axial direction,
    wherein the main lock portion has:
        a support bore for slidably supporting the main lock member and the moving member in such a way that the main lock member and the moving member can be reciprocated in the axial direction, respectively;
        a main lock release chamber that is formed around the main lock member and applies pressure of the working liquid, which is introduced thereinto during a normal operation after starting the internal combustion engine, to the main lock member to thereby move the main lock member to the release position and applies the pressure to the moving member to thereby move the moving member to the first position; and a main elastic member for biasing the main lock member to a fitting-in position side, wherein the lock control portion has:

a control elastic member for generating a restoring force; and a ring member that is coaxially inserted into the support bore with a play and is coaxially fitted on an outside of the main lock member via a sealing clearance of a specified size and receives the restoring force and hence is put into face contact with the moving member from the first position side, thereby pressing the moving member to the second position side, wherein the allowance clearance is formed in a size to allow the main lock member to be slanted with respect to the moving member to thereby allow the working liquid to flow in from the main lock release chamber, and wherein the sealing clearance is formed in a size smaller than the allowance clearance on a side opposite to the main lock release chamber across the allowance clearance in the axial direction, thereby inhibiting the working liquid from passing through the allowance clearance in conjunction with a contact interface between the moving member and the ring member.

6. The valve timing adjusting device according to claim 5, wherein the allowance clearance allows the main lock member to be slanted to a maximum angle in the support bore.

7. The valve timing adjusting device according to claim 5, wherein the ring member is coaxially inserted on an inner circumferential side of the moving member with a play in the support bore, and wherein a clearance, which is formed between the ring member and the moving member and in a specified size, allows the ring member in the support bore to be slanted to a maximum angle in a state where the main lock member in the support bore is slanted to a maximum angle.

8. The valve timing adjusting device according to claim 5, wherein the control elastic member of a coil spring is coaxially arranged on an outer circumferential side of the main lock member, and wherein the ring member has a guide part formed at least on one side of an inner circumferential side and an outer circumferential side of the control elastic member, the guide part guiding the control elastic member in the axial direction.

9. The valve timing adjusting device according to claim 1, comprising:

an advance elastic member for biasing the vane rotor to an advance side with respect to the housing rotor at the rotation phase between the main lock phase and the subordinate lock phase.

10. A valve timing adjusting device for adjusting a valve timing of an intake valve for opening and closing a cylinder of an internal combustion engine by pressure of a working liquid, the valve timing adjusting device comprising:

a housing rotor that rotates in conjunction with a crankshaft of the internal combustion engine;

a vane rotor that rotates in conjunction with a camshaft of the internal combustion engine and receives pressure of the working liquid in the housing rotor, thereby having a rotation phase changed with respect to the housing rotor;

a main lock portion that has a main lock member and a main lock bore, wherein at a main lock phase of the rotation phase for closing the intake valve at a timing later than a timing when a piston in the cylinder reaches a bottom dead center, the main lock member is fitted in the main lock bore to thereby lock the rotation phase;

a subordinate lock portion that has a subordinate lock member and a subordinate lock bore, wherein at a subordinate lock phase of the rotation phase advancing further than the main lock phase, the subordinate lock member is fitted in the subordinate lock bore to thereby lock the rotation phase; and a lock control portion that has a temperature sensing body to be expanded and contracted and a moving member to be reciprocated between an opening position in which the main lock bore is opened and a closing position in which the main lock bore is closed, wherein at the main lock phase in a warm stop state during which temperature of the stopped internal combustion engine becomes not less than a preset temperature, the temperature sensing body is changed to an expanded state, whereby the moving member is latched at the opening position in which the main lock member is allowed to be fitted in the main lock bore, and wherein at the main lock phase in a cold stop state caused after the temperature of the stopped internal combustion engine becomes less than the preset temperature, the temperature sensing body is changed to a contracted state, whereby the moving member is unlatched and hence the moving member is moved to the closing position in which the main lock member is released from being fitted in the main lock bore.

* * * * *